US011952290B2

United States Patent
Cravalho et al.

(10) Patent No.: US 11,952,290 B2
(45) Date of Patent: *Apr. 9, 2024

(54) SYSTEM AND METHOD FOR PRODUCING ALKALINE WATER HAVING pH STABILITY AND INCREASED MINERAL CONTENT

(71) Applicant: Generosity Water, Inc., Montebello, CA (US)

(72) Inventors: Micah Cravalho, La Quinta, CA (US); Jasmine Davenport, Los Angeles, CA (US); Lamont Wright, Blue Jay, CA (US)

(73) Assignee: GENEROSITY WATER, INC., Montebello, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/234,024

(22) Filed: Aug. 15, 2023

(65) Prior Publication Data

US 2024/0059583 A1    Feb. 22, 2024

Related U.S. Application Data

(60) Provisional application No. 63/398,389, filed on Aug. 16, 2022.

(51) Int. Cl.
*C02F 1/00* (2023.01)
*C02F 9/00* (2023.01)
(Continued)

(52) U.S. Cl.
CPC ............... *C02F 1/008* (2013.01); *C02F 9/00* (2013.01); *C02F 1/003* (2013.01); *C02F 1/32* (2013.01); *C02F 1/441* (2013.01); *C02F 1/444* (2013.01); *C02F 1/4695* (2013.01); *C02F 1/687* (2013.01); *C02F 1/78* (2013.01); *C02F 2201/005* (2013.01); *C02F 2209/001* (2013.01); *C02F 2209/008* (2013.01); *C02F 2209/06* (2013.01); *C02F 2209/10* (2013.01); *C02F 2307/06* (2013.01)

(58) Field of Classification Search
None
See application file for complete search history.

(56) References Cited

U.S. PATENT DOCUMENTS 5,853,579 A    12/1998    Rummler et al.
6,193,886 B1    2/2001    Nohren, Jr.
(Continued)

FOREIGN PATENT DOCUMENTS

WO    2014093049 A1    6/2014
WO    2021234709 A1    11/2021

*Primary Examiner* — Richard C Gurtowski
(74) *Attorney, Agent, or Firm* — NEO IP

(57) ABSTRACT

A system and method for increasing total dissolved solids (TDS) concentration and pH of water is provided herein. The water is processed using a variety of filtration and purification methods, including carbon filtration, water softening, reverse osmosis, and electrodeionization. After filtration and purification, the water is pumped into a mineral infusion chamber, including a plurality of bioceramic components. At least one TDS sensor monitors the TDS concentration of the water stream, and a flow rate out of the mineral infusion chamber is controlled by a flow control valve based on sensor data produced by the at least one TDS sensor.

13 Claims, 11 Drawing Sheets

(51) Int. Cl.
   *C02F 1/32*   (2023.01)
   *C02F 1/44*   (2023.01)
   *C02F 1/469*  (2023.01)
   *C02F 1/68*   (2023.01)
   *C02F 1/78*   (2023.01)

(56) References Cited

U.S. PATENT DOCUMENTS

| | | | |
|---|---|---|---|
| 6,245,701 B1 | 6/2001 | Sato | |
| 6,294,073 B1 | 9/2001 | Shirota et al. | |
| 6,464,845 B2 | 10/2002 | Shirota et al. | |
| 6,572,902 B2 | 6/2003 | Abramowitz et al. | |
| 6,928,954 B2 | 8/2005 | Krishnamurthy | |
| 7,712,613 B2 | 5/2010 | Bahm et al. | |
| 7,931,683 B2 | 4/2011 | Weber et al. | |
| 8,318,191 B2 | 11/2012 | Yun et al. | |
| 8,454,837 B2 | 6/2013 | Bauer | |
| 8,550,257 B2 | 10/2013 | Harvey | |
| 8,784,662 B2 | 7/2014 | Becker et al. | |
| 9,067,807 B2 | 6/2015 | Soane et al. | |
| 9,212,067 B2 | 12/2015 | Gellibolian et al. | |
| 10,294,128 B2 | 5/2019 | Xiao | |
| 10,532,303 B2 | 1/2020 | Gibson et al. | |
| 2003/0164333 A1 | 9/2003 | Nohren et al. | |
| 2006/0163174 A1* | 7/2006 | Namespetra | C02F 1/78 210/192 |
| 2008/0035552 A1 | 2/2008 | Lee | |
| 2009/0084726 A1 | 4/2009 | Lee | |
| 2010/0163472 A1 | 7/2010 | Thiers et al. | |
| 2011/0198271 A1 | 8/2011 | Lee et al. | |
| 2013/0122150 A1 | 5/2013 | Kim | |
| 2017/0203986 A1 | 7/2017 | Ervin | |
| 2018/0022620 A1 | 1/2018 | Garg | |
| 2018/0134586 A1 | 5/2018 | Weston et al. | |
| 2019/0118124 A1 | 4/2019 | Jhee | |
| 2020/0108344 A1* | 4/2020 | Vollmer | B01D 5/0072 |
| 2020/0247700 A1 | 8/2020 | Genin et al. | |
| 2021/0002149 A1 | 1/2021 | Adams | |
| 2021/0002160 A1 | 1/2021 | Van Gils et al. | |
| 2021/0321653 A1 | 10/2021 | Kubota | |
| 2022/0073397 A1 | 3/2022 | Dus et al. | |
| 2022/0153613 A1 | 5/2022 | Katragadda | |

* cited by examiner

SYSTEM AND METHOD FOR PRODUCING ALKALINE WATER HAVING pH STABILITY AND INCREASED MINERAL CONTENT

CROSS-REFERENCE TO RELATED APPLICATIONS

This application is related to and claims priority from the following US patents and patent applications: this application claims priority from U.S. Provisional Patent Application No. 63/398,389, filed Aug. 16, 2022, which is incorporated herein reference in its entirety.

BACKGROUND OF THE INVENTION

1. Field of the Invention

The present invention relates to purifying water and introducing mineral additives to water, and more specifically to methods for generating water having a pH between approximately 9 and 10 by means of introducing mineral additives.

2. Description of the Prior Art

It is generally known in the prior art to provide water filtration and purification. Water treatment commonly begins with a pretreatment step, usually including screen filtration for eliminating large debris (e.g., sticks, leaves, etc.) and pre-chlorination to prevent colony growth in the filtration system. After pre-filtration, pH treatment is often used to either raise or lower the pH of the incoming water, depending on the source. For example, for acidic water, which is common in acid rain and wells receiving runoff from acid rain, lime, calcite, magnesium oxide, soda ash, or sodium hydroxide are commonly used to increase the water hardness. Alternatively, degasifiers are used to remove carbon dioxide from the water and therefore raise the pH. These methods are preferably used to either neutralize the water (i.e., set the pH near to 7) or to make the water slightly alkaline (e.g., a pH of approximately 7.5). This is useful, as long-term exposure to acidic water frequently damages pipes and acidic water is more likely to leech potentially harmful heavy metals, such as lead. Alternatively, if the incoming water is alkaline, which is frequently the case for sea water, then acidic additives are frequently used to soften the water, such as carbonic acid, hydrochloric acid, or sulfuric acid.

After pre-treatment, many treatment methods employ a filtration dedicated to removing suspended particulates from the water. One method of filtering suspended particulates moves water through a sediment filter, which sometimes includes a layer of activated carbon. As the water moves through the sediment, particles become trapped in the pores of the filter, cleaning the water. Alternatively, other methods utilize selectively permeable membranes, which help to filter out particulates, including parasites, from the water.

While filtration is useful for filtering out solid particulates, it does not eliminate dissolved solids within the water. For dissolved solids, softeners are frequently used. Softeners seek to eliminate minerals from water (e.g., calcium and magnesium ions) by treating the water with lime, soda ash, or other softeners in order to precipitate calcium carbonate or other precipitates. Alternatively, electrodeionization (EDI) is able to used, which runs water through opposite charged electrodes, with ion-exchange membranes splitting positively charged ions from negatively charged ions in the water, allowing for almost complete elimination of ions from the water. This technique is commonly paired with reverse osmosis as a polishing technique.

Additionally, the use of disinfectants is common in treating water to eliminate organic matter. Disinfectants include chemical disinfectants, such as chlorine, chlorine dioxide, chloramine, or ozone, and radiative disinfectants, such as ultraviolet (UV) light, X-rays, or gamma rays. Additionally, some purification techniques subject water to high levels of eat in order to kill microorganisms and denature potentially harmful toxins or use activated carbon to adsorb potentially harmful compounds in the water.

One important feature of some water purification processes is reverse osmosis. Reverse osmosis utilizes a semi-permeable membrane, with water with a higher concentration of contaminants on one side of the semi-permeable membrane and water with a lower concentration of contaminants on the other side of the semi-permeable membrane. Unlike in osmosis, a pressure is applied to counteract the osmotic pressure and force water from the side with higher concentration of contaminants to the side with a lower concentration. Reverse osmosis itself often comprises several different layers of filtration, including a sediment filter for larger particulates, a first carbon filter for attracting smaller particulates and positively charged ions (e.g., chlorine), a reverse osmosis membrane for removing molecules heavier than water (e.g., sodium, lead, dissolved minerals, and fluoride), and a second carbon filter for polishing the water. Reverse osmosis is capable of much greater filtration than, for example, carbon filtration, as it is able to remove particles as small as 0.001 microns, rather than 1 micron, as with carbon filtration.

Different methods of making alkaline drinking water have been proposed. For example, some common home remedies include adding small amounts of baking soda and lemon juice to water. Alternatively, under-sink water ionizers, such as the MXL series offered by LIFE IONIZER, instead focus on utilizing electrolysis to separate water streams into acidic and alkaline components. Alternatively, other methods increase mineral concentration in water following reverse osmosis purification using remineralizers, which increase the total dissolved solids (TDS) in the water using calcium, calcite, and/or coconut shell carbon filters (alternatively, lime or caustic soda are sometimes added for remineralization). While remineralizers typically do not significantly change pH themselves, remineralizers are commonly paired with ionizers in order to increase the pH. Some systems, such as the OMYAQUA system utilize calcium carbonate stones and run water all the calcium carbonate stones in order to remineralize and increase the pH of the water.

In addition to municipal remineralizers commonly paired with reverse osmosis systems, countertop remineralizing filters have begun to be sold in recent years. For example, SANTEVIA markets the PURE EARTH WATER SYSTEM, which runs water over natural Maifan stones in order to reinfuse calcium, iron, magnesium, potassium, zinc and other materials into the water. These systems typically function as passive systems, with the water passing over the stones a single time and being infused with whatever quantity of minerals is able to pass into the water with a single pass-through.

Prior art patent documents include the following:

US Patent Publication No. 2022/0153613 for Ultra-High Alkaline Electrolyzed Water Generation System by inventor Katragadda, filed Nov. 20, 2020 and published May 19, 2022, discloses an ultra-high alkaline electrolyzed water generation system with a pH 12.5-13.5 pH. The ultra-high alkaline electrolyzed water generation system includes an electrolytic cell, a first tank, a second tank, a water tank, and a plurality of flowlines. The ultra-high alkaline electrolyzed water generation system is cost-effective. The ultra-high alkaline electrolyzed water generation system enables production of ultra-high alkaline electrolyzed water at faster rate for commercial and industrial applications with a large shelf life and can be stored in containers for later use. The invention also provides an electrolytic cell. The electrolytic cell includes a cathode chamber, an anode chamber, and a cation permselective membrane. The electrolytic cell enables production of the ultra-high alkaline electrolyzed water. The ultra-high alkaline electrolyzed water with a configurable pH range has the ability to sterilize, clean and disinfect without the use of harsh chemicals.

U.S. Pat. No. 6,245,701 for Porous ceramic for producing alkali ion water, method for producing the porous ceramic and device for producing the alkali ion water by inventor Sato, filed Jan. 28, 1999 and issued Jun. 12, 2001, discloses a porous ceramic used for producing alkali ion water. The ceramic of the invention includes finely particulate zeolite having an average particle size of 0.1 to 40 µm and an alkali ion producing material as components. Besides the above components, the invention preferably comprises a fibrous mineral and/or a clay mineral. To produce the ceramic of the invention, a slurry obtained by grinding zeolite by a wet process, a slurry obtained by grinding the alkali ion producing material and the clay mineral by a wet process and a slurry obtained by grinding the fibrous mineral are first mixed and stirred to prepare a mixed slurry. This mixed slurry is then dried and fired to obtain a sintered body.

US Patent Publication No. 2018/0134586 for Process of making alkaline and acidic water by inventors Weston et al., filed May 5, 2016 and published May 17, 2018, discloses a process of making an alkaline water and acidic water wherein the step of dissolving the alkaline salt in the initial stream is further defined as adding the alkaline salt of a lower alkyl carboxylic acid of sodium propionate to the initial stream. The step of electrolyzing the feed stream further includes a step of applying an electric potential between the cathode and the anode. The step of applying the electrical potential is further defined as applying the electrical potential of between 0.5V and 50 V between the cathode and the anode. The alkaline water composition produced by the process includes zero hydroxide ions and defines a total alkalinity between 40 ppm and 510 ppm. The alkaline water also has a TDS between 58 ppm and 1000 ppm, a pH between 10.0 and 12.0, a hardness rating between 3.5 and 10, and a Langelier Index between 0.37 and 2.20.

US Patent Publication No. 2021/0002149 for Production of Highly Ionized Alkaline Water Using a Combination of Reducing Metals and Reductive Minerals by inventor Adams, filed Sep. 21, 2020 and published Jan. 7, 2021, discloses methods and systems are provided for producing ionized alkaline solutions (e.g. ionized alkaline water) that exhibit long-term stability when stored at room temperature.

U.S. Pat. No. 6,572,902 for Process for producing improved alkaline drinking water and the product produced thereby by inventors Abramowitz et al., filed Apr. 25, 2001 and issued Jun. 3, 2003, discloses a process for producing improved alkaline water including filtering potable source water to remove selected particles and then purifying the filtered water. Selected alkaline minerals are added to the purified water, with the resulting mineralized water being then electrolyzed to produce streams of acidic water and alkaline water, the alkaline water having a pH within the range of 9-10, a TDS range of 22-240 ppm (parts per million) and alkalinity in the range of 12-216 ppm.

U.S. Pat. No. 6,464,845 for Manufacturing method and apparatus for making alkaline ionized water and acidic water by inventors Shirota et al., filed May 9, 2001 and issued Oct. 15, 2002, discloses a manufacturing apparatus for producing alkaline ionized water and acidic water by electrolysis of water having an electrolytic bath including a cathode cell, an intermediate cell, and an anode cell, separated by diaphragms; an electrolysis solution bath connected to the intermediate cell via an electrolysis solution circulating line and an electrolysis solution circulating pump; a circulation container bath for alkaline ionized water connected to the cathode cell via an alkaline ionized water circulating line and an alkaline ionized water circulating pump; a supplying line for raw material water for producing acidic water connected to an inlet of the anode cell; a withdrawing line for acidic water connected to an outlet of the anode cell; a supplying system for raw material water for making the alkaline ionized water connected to the circulation container bath and a withdrawing line with a water collecting device for withdrawing alkaline ionized water.

U.S. Pat. No. 6,294,073 for Manufacturing method and apparatus of alkaline ionized water by inventors Shirota et al., filed Oct. 20, 1998 and issued Sep. 25, 2001, discloses a manufacturing method and apparatus of strongly alkaline ionized water exceeding pH 12.0 by electrolysis of water. As an electrolysis solution supplied to a cathode cell of an electrolytic bath, alkaline ionized water produced in the cathode cell is used, and an operation, in which the alkaline ionized water produced in the cathode cell is circulated and supplied to the cathode cell and is subjected to application of electrolytic voltage, is repeated, so that a cation is accumulated to increase the pH value. As a method for circulating and supplying the alkaline ionized water produced in the cathode cell to the cathode cell, a circulation container bath is used, and the circulation container bath and the cathode cell of the electrolytic bath are connected via a circulating line containing a circulating pump. The circulation container bath has a withdrawing system containing a water collecting device for withdrawing alkaline ionized water having a desired pH value to the outside.

US Patent Publication No. 2017/0203986 for Water purification system by inventor Ervin, filed Jan. 13, 2017 and published Jul. 20, 2017, discloses systems for water treatment include a preprocessing stage, an ultraviolet treatment stage, and a filtering stage. The preprocessing stage includes first and second chambers including first and second filter media. The first and second chambers include perforated plates. The first chamber and second chamber are vertically arranged in a filter tower. The ultraviolet treatment stage receives water in a plurality of reactor tanks. Each reactor tank of the plurality includes an inlet, an outlet, crystal sleeve disposed centrally to the interior of the reactor tank, and a UVC light source contained within the crystal sleeve. A controller operates the ultraviolet treatment stage to sequentially fill each reactor tank and sequentially drain each reactor tank and operates a respective UVC light source to emit UVC wavelength radiation within a respective reactor tank while water is in the respective reactor tank.

US Patent Publication No. 2022/0073397 for Combined water filtration system for enhancing drinking water properties for human health by inventors Dus et al., filed Jan. 9, 2020 and published Mar. 10, 2022, discloses a water filtration system for producing filtrated drinking water having increased persistence of free hydrogen, pH and ORP level, includes a pre-filtration device having an inlet terminal configured for being connected with a water source and an outlet terminal; the water filtration system being characterized in further comprising a far-Infrared, fIR, filtration device having an inlet terminal in connection with the outlet terminal of the pre-filtration device and an outlet terminal; and an elemental hydrogen releasing device having an inlet terminal in connection with the outlet terminal of the fIR filtration device and an outlet terminal, the elemental hydrogen releasing device configured for utilizing a reaction between elemental magnesium, Mg, or a magnesium mineral and water flowing there through and configured for releasing free hydrogen and Mg2+ ions to water flowing there through with a Mg2+ release rate in the range from 20 to 40 mg/l of Mg2+ ions.

US Patent Publication No. 2019/0118124 for Hydrogen water and magnetic water generating water bottle by inventor Jhee, filed Feb. 23, 2017 and published Apr. 25, 2019, discloses a hydrogen water and magnetic water generating water bottle simultaneously turning water filled into the water bottle into magnetic water and hydrogen water, enabling both the top and bottom of the water bottle to be opened using top and bottom caps, enabling the internal cleaning of the water bottle to be cleanly carried out, and enabling the easy exchange of a magnetic water generating means and a hydrogen water generating means. The water bottle includes top and bottom opening parts. Magnetic water generating means is detachably provided to penetrate the top opening part, is disposed in the top of an inner part of the water bottle, and discharges upwardly the water filled into the water bottle. Hydrogen water generating means is detachably provided to penetrate the bottom opening part and is disposed in the bottom of the inner part.

U.S. Pat. No. 9,212,067 for Water bottle with flow meter by inventors Gellibolian et al., filed May 30, 2013 and issued Dec. 15, 2015, discloses a fluid and/or aqueous additive delivery system. A modular fluid container is for consumption of liquids. Fluid containers include any combination of four distinct modular components; (1) an end-point filter purification module for removal of impurities from water, (2) a UV purification module for emitting ultraviolet (UV) light in a germicidal spectrum for disinfection, (3) a tablet storage and dispensing module to emit ultraviolet (UV) light in a germicidal spectrum for disinfection of a volume of drink liquid held in the container, (4) a flow meter module for quantitatively monitoring hydration in real time. The user can personalize the bottle with any or all modules that are required.

U.S. Pat. No. 6,193,886 for Sub-micron sport bottle with ceramic filtering element by inventor Nohren, filed Aug. 11, 1998 and issued Feb. 27, 2001, discloses a ceramic filter assembly for use in a bottle for filtering water exiting the bottle so as to remove substantially all protozoa and bacteria from the water. The assembly includes a self-supporting ceramic filtering material element having a pore size of about 0.55 microns or less (e.g. about microns) yet having a large open volume (e.g. between 40-85%, preferably between 51-80%), so that water may pass through it at a rate of 2 milliliters per second or more (e.g. 3-6 milliliters per second) with an initial head pressure of no more than 24 inches of water, so that the water may readily be passed through the filter by inverting and/or squeezing the plastic bottle containing the filter. A second, non-ceramic, filter element (such as a carbon block filter for reducing chlorine) may be mounted within the ceramic filter element, and a positively charged coating may be provided on the external surface of the ceramic filter element capable of attracting and holding negatively charged viruses. Water can be removed from the bottle by attaching the filter assembly to a straw, or the filter assembly may be mounted to a cap having a manual valve.

US Patent Publication No. 2009/0084726 for Multi-functional dual filtering kettle by inventor Lee, filed Sep. 28, 2007 and published Apr. 2, 2009, discloses a multi-functional dual filtering kettle comprising a kettle body; a filter received in the kettle body; a cover covering upon an upper opening of the kettle body; an inner side of the filter having a ceramic filter unit and a compound filter unit being installed below the filter. The ceramic filter unit has the function of emitting far field infrared rays; and the compound filter unit filter has the function of removing the impurities, microorganisms, odor, and organic compounds in water. The ceramic filter unit has a plurality of biochemical ceramic balls which has the function of emitting far field infrared rays. A hollow space of the compound filter unit is filled with a filter layer, an active carbon layer, and a ceramic layer.

U.S. Pat. No. 6,928,954 for Automatic pet waterer by inventor Krishnamurthy, filed Oct. 23, 2003 and issued Aug. 16, 2005, discloses a pet watering system which includes a refillable reservoir for holding water. A base is provided that holds the reservoir and receives water therefrom. Secured to the front of the base is a bowl which receives water from the base. A pump circulates water between the base and the bowl. A well is associated with the base, into which water is received from the base before being circulated into the bowl.

US Patent Publication No. 2020/0247700 for Multistage shower water filter and water filtering method by inventors Genin et al., filed Feb. 1, 2019 and published Aug. 6, 2020, discloses a multistage shower filter assembly for water filtering having an in-line reversible filter, changeable by unscrewing two portions of the housing. The housing exterior includes a plurality of gripping means to allow easy opening and closing of the housing and to prevent slippage of the hands of a user gripping the two portions, even when wet. The multistage shower filter assembly includes a separate internal multistage filter element that may be easily inserted into or removed from the multistage shower filter assembly to allow the internal filter element to be easily reversed for longer use.

US Patent Publication No. 2003/0164333 for In-line hydration pack biological filter by inventors Nohren et al., filed Feb. 12, 2003 and published Sep. 4, 2003, discloses a portable filtration assembly including a housing containing a water inlet port and a water outlet port and a sub-micron filter disposed in the housing having hydrophilic sub-micron rated membrane filter elements. The sub-micron filter is configured to effect a six log reduction of bacteria (99.9999%) and a four log reduction of protozoa (99.99%) at a flow rate between 10-30 mL/sec requiring a pressure of 1.5-10 psi. The assembly also includes structure for venting air through the hydrophilic sub-micron rated membrane filter elements. The assembly may additionally include a monolithic radial flow carbon composite filter also disposed in the housing. The monolithic radial flow carbon composite filter is configured for removing at least 80% of chlorine and at least 90% of lead over a minimum of forty gallons at a flow rate of 10 mL/sec at a pressure drop of 10 psi or less.

US Patent Publication No. 2011/0198271 for Water purifier for outdoor by inventors Lee et al., filed Mar. 27, 2008 and published Aug. 18, 2011, discloses an outdoor water purifier using a ceramic filter. The outdoor water purifier is installed in home water pipes or water supply pipes for various industrial purposes to sterilize water and improve water purity. The outdoor water purifier includes a water gauge that measures the flow of tap water to calculate the water use rate, a filter connected to the water gauge for filtering tap water, a filter alarm that measures the state of the filter, and an RF transmitter connected to the filter for wirelessly transmitting data of tap water use rate according to the amount of tap water used. The filter is installed to a water supply pipe and configured in such a way that a carbon layer, a ceramic layer, an antibacterial layer, and a fine ceramic layer, stacking from the top thereof, in order to improve taste and to remove odor and bacteria contained in raw water.

US Patent Publication No. 2008/0035552 for Multi-function and multi-layer filtration device by inventor Lee, filed May 18, 2006 and published Feb. 14, 2008, discloses a filtration device mainly containing a hollow body member having a water inlet and a water outlet at two ends; a number of open-top container members vertically stacked and reliably positioned, inside the body member; and a number of agent members placed inside the container members respectively. Each of the container members has a number of through holes arranged spirally at the bottom so that the water is forced into a swirl as it flows through the container members to make full utilization of the agent members. The body member is sealed by a cover that can be easily twisted close or open. As such, the standardized container members can be easily accessed and the agent members can be easily replaced.

U.S. Pat. No. 9,067,807 for Treatment of wastewater by inventors Soane et al., filed Oct. 20, 2010 and issued Jun. 30, 2015, discloses systems, methods and devices for removing contaminants from an aqueous stream. In embodiments, these systems and methods may be applied to particular applications, for example removal of contaminants in aqueous streams associated with the petroleum industry.

US Patent Publication No. 2010/0163472 for Water purification system by inventors Thiers et al., filed Mar. 21, 2008 and published Jul. 1, 2010, discloses systems and methods for water purification. The system can include devices and methods for reducing scale accumulation in a water distillation system.

US Patent Publication No. 2021/0002160 for Membrane filtration apparatus and process for reuse of industrial wastewater by inventors Van Gils et al., filed Sep. 20, 2020 and published Jan. 7, 2021, discloses laundry, industrial or food processing wastewater being purified to the degree that it can be reused. Water quality is ensured through the final process of reverse osmosis ("RO") which removes dissolved contaminants such as mineral hardness, soils and residual detergents. The process combines a ceramic tubular cross-flow membrane filter to remove the suspended solids, oils and greases ahead of the RO. The RO process employs high temperature, low fouling membranes. This enables the RO process to operate sustainably, i.e. without fouling, plugging or membrane degradation.

U.S. Pat. No. 8,550,257 for Ceramic water purification device by inventor Harvey, filed Jun. 2, 2010 and issued Oct. 8, 2013, discloses a ceramic water purifying device. The device includes a silver treated packed particle bed in one embodiment. The device may also include feldspar or bottled glass.

U.S. Pat. No. 10,532,303 for Ceramic filters by inventors Gibson et al., filed Mar. 11, 2014 and issued Jan. 14, 2020, discloses additively manufactured ceramic filters. A plurality of pores, each having a uniform geometry, are arranged between an inlet surface and an outlet surface of a single unit of ceramic such that the plurality of pores change in size uniformly from the inlet surface to the outlet surface. The pores are respectively interconnected, and the size, shape, orientation, and/or interconnection of the pores are chosen to provide hydrodynamic features that provide effective filtration for a given liquid and contamination. The pores are additively manufactured with optimized precision.

U.S. Pat. No. 8,318,191 for Porous material having hierarchical porous structure and preparation method thereof by inventors Yun et al., filed Oct. 16, 2008 and issued Nov. 27, 2012, discloses porous ceramic balls with a hierarchical porous structure ranging in size from nanometers to micrometers, and preparation methods thereof. Self-assembly polymers and sol-gel reactions are used to prepare porous ceramic balls in which pores ranging in size from ones of nanometers to tens of micrometers are hierarchically interconnected to one another. This hierarchical porous structure ensures high specific surface areas and porosities for the porous ceramic balls. Further, the size and distribution of the pores can be simply controlled with hydrophobic solvent and reaction time. The pore formation through polymer self-assembly and sol-gel reactions can be applied to ceramic and transition metals. Porous structures based on bioceramic materials, such as bioactive glass, allow the formation of apatite therein and thus can be used as biomaterials of bioengineering, including bone fillers, bone reconstruction materials, bone scaffolds, etc.

U.S. Pat. No. 7,712,613 for Water filter materials and water filters containing a mixture of microporous and mesoporous carbon particles by inventors Bahm et al., filed Sep. 16, 2008 and issued May 11, 2010, discloses a filter and filter material for providing or treating potable water. The filter includes a housing having an inlet and an outlet, a filter material disposed within the housing, the filter material formed at least in part from a mixture of a plurality of mesoporous and microporous activated carbon particles. Preferably, at least some of the mesoporous activated carbon filter particles are coated with a cationic polymer, and even more preferably, at least some of the particles are coated with a cationic polymer and silver or a silver containing material. Kits comprising filters and information relating to the reduction, killing or removal of bacteria, viruses, microbials, and TTHM are also provided.

U.S. Pat. No. 7,931,683 for Articles having ceramic coated surfaces by inventors Weber et al., filed Jul. 27, 2007 and issued Apr. 26, 2011, discloses articles which comprise a substrate and a ceramic coating which covers at least a portion of the substrate surface. The ceramic coating includes raised ceramic shells connected by a ceramic layer that is conformal with the substrate. According to another aspect of the present invention, carbon nanotubes are provided, which comprise a ceramic coating covering at least a portion of the carbon nanotubes.

US Patent Publication No. 2018/0022620 for Walter Filtration Device by inventor Garg, filed Jul. 24, 2016 and published Jan. 25, 2018, discloses a portable, single-chambered, hand-pressurized water filtration device employing a two-part filtration unit consisting of a ceramic filter and an activated charcoal filter through which pressurized water is forced, filtered and removed via a spigot in fluid communication with the filtration unit.

U.S. Pat. No. 8,784,662 for Filtration with internal fouling control by inventors Becker et al., filed Sep. 12, 2008 and issued Jul. 22, 2014, discloses filtration processes and systems for the separation of a filterable fluid stream by a filtration membrane module with uniform transmembrane pressure and flux along the membrane and internal control of membrane fouling via intermittent periodic reduction of the pressure differential between the permeate and retentate sides of the membrane and/or backwashing cycles during separation, recovery, and/or purification of proteins, peptides, nucleic acids, biologically produced polymers and other compounds or materials from aqueous fluids.

U.S. Pat. No. 8,454,837 for Systems and methods for generation of low zeta potential mineral crystals to enhance quality of liquid solutions by inventor Bauer, filed May 3, 2010 and issued Jun. 4, 2013, discloses methods and systems for enhancing of quality of liquid by treating a source liquid to enhance the concentration of low zeta potential crystals and produce a treated liquid having a higher concentration of low zeta potential crystals than that of the source liquid. The inventive system comprises an aqueous liquid source having a threshold concentration of selected minerals and a low zeta potential crystal generator for treating the aqueous source liquid to produce treated liquid having an enhanced concentration of low zeta potential crystals.

U.S. Pat. No. 5,853,579 for Treatment system by inventors Rummler et al., filed Nov. 26, 1996 and issued Dec. 29, 1998, discloses a treatment system which can treat solid materials and/or liquid materials. Preferably, a separator initially separates liquid and solid materials, and the solid materials are deposited upon a substrate within a microwave cavity. Liquids remaining with the solid materials drain through the substrate, and the solid materials are subjected to microwaves. The liquids exiting the separator are preferably also passed through a filter assembly which retains any suspended particles remaining in the liquid, and subjects the particles to microwaves. Exhaust filters can also be provided for the microwave cavities, and the exhaust filters can also be subject to microwaves to incinerate any particles remaining in the exhaust gas. Fire tube arrangements for incinerating solid materials retained or extracted by substrates or filters are also provided.

U.S. Pat. No. 10,294,128 for Device for preparing drinking water by electrolysis by inventor Xiao, filed Apr. 10, 2015 and issued May 21, 2019, discloses a device preparing drinking water by electrolysis, belonging to the technical field of equipment for electrolysis of water. The device includes a water container, at least one pair of a cathode and an anode arranged within the water container, and an electrolysis power source used for supplying electricity to the cathode and the anode; a water-permeable membrane is arranged between the coupled cathode and anode, and the water-permeable membrane covers the anode, the range of the distance δ between the water-permeable membrane and the cathode being 0<δ<10 mm. The device, when electrolyzing water, can prepare water which has a low oxidation reduction potential, is rich in hydrogen and has a certain sterilization capability and is suitable for drinking.

US Patent Publication No. 2013/0122150 for Alkaline Antioxidant Mineral Water by inventor Kim, filed Nov. 16, 2011 and published May 16, 2013, discloses an alkaline antioxidant mineral water comprising tripotassium phosphate and multiple healthful minerals in water, which is free of chlorine, fluoride, and heavy metals. The alkaline mineral water further includes organic potassium, calcium, zinc, magnesium, selenium and 79 trace minerals from ancient sea salt. The trace minerals are taken from the low-sodium technically-processed magnesium chloride marine deposits and chelated with amino acids. The amino acids are obtained from a non-animal source which is suitable for vegetarian and persons who are allergic to animal proteins. The alkaline antioxidant mineral water neutralizes and eliminates the excess acids in human body, thus improving blood circulation. In addition, it provides electrolytes and minerals, which are beneficial to human body.

US Patent Publication No. 2021/0321653 for Functional Water by inventor Kubota, filed Jan. 20, 2020 and published Oct. 21, 2021, discloses a functional water containing a polyfunctional amine and/or a salt thereof as a functional component, wherein the total content of water, the polyfunctional amine, and the salt of the polyfunctional amine is 95% by weight or more. The polyfunctional amine is at least a specific polyamine, a polymer having a structural unit derived from a specific cyclic amine, or a polymer having a structural unit derived from a specific unsaturated amine. The total content of the polyfunctional amine and/or salt thereof is preferably 0.0001 to 10000 ppm by weight. The functional water has functions including freshness-keeping for foods, aging of foods, antisepsis, deodorization, adjustment of plant growth, life extension for cut flowers, flowering control for cut flowers, pest control, pest repellence, improvement of bowel movement, reduction of fecal odor, reduction of blood pressure, increase of body temperature, improvement of the intraoral environment, prevention of halitosis, and prevention of body odor.

SUMMARY OF THE INVENTION

The present invention relates to purifying water and introducing mineral additives to water, and more specifically to methods for generating water having a pH between approximately 9 and 10 by means of introducing mineral additives.

It is an object of this invention to improved techniques for introducing mineral additives to water, to increase alkalinity of the water.

In one embodiment, the present invention is directed to a system for generating mineral-infused water, including an inlet for receiving water, a water purification system configured to remove particulates from the water, at least one mineral infuser including bioceramic material in fluid connection with the water purification system, a first valve configured to allow and restrict water flow between the water purification system and the at least one mineral infuser, at least one total dissolved solids (TDS) sensor and/or at least one pH sensor configured to detect TDS and/or pH of water exiting the at least one mineral infuser, and at least one controller configured to receive sensor data from the at least one TDS sensor and/or the at least one pH sensor and control the first valve and/or a second valve based on the TDS or the pH of the water exiting the at least one mineral infuser, wherein, if the TDS of the water exiting the at least one mineral infuser is below a preset minimum threshold, then the at least one controller causes the water exiting the at least one mineral infuser to be recirculated through the first valve.

In another embodiment, the present invention is directed to a method for generating mineral-infused water, including pumping water in through an inlet of a water purification system, the water purification system removing particulates from the water, a first valve allowing or restricting water flow between the water purification system and at least one mineral infuser including bioceramic material, at least one total dissolved solids (TDS) sensor and/or at least one pH sensor detecting TDS and/or pH of water exiting the at least one mineral infuser, and at least one controller receiving sensor data from the at least one TDS sensor and/or the at least one pH sensor and controlling the first valve and/or a second valve based on the TDS or the pH of the water exiting the at least one mineral infuser, wherein the at least one controller causing the water exiting the at least one mineral infuser to be recirculated through the first valve if the TDS of the water exiting the at least one mineral infuser is below a preset minimum threshold.

In yet another embodiment, the present invention is directed to a system for generating mineral-infused water, including an inlet for receiving water, a water purification system configured to remove particulates from the water, at least one mineral infuser including bioceramic material in fluid connection with the water purification system, a first valve configured to allow and restrict water flow between the water purification system and the at least one mineral infuser, at least one total dissolved solids (TDS) sensor and/or at least one pH sensor configured to detect TDS and/or pH of water exiting the at least one mineral infuser, and at least one controller configured to receive sensor data from the at least one TDS sensor and/or the at least one pH sensor and control the first valve and/or a second valve based on the TDS or the pH of the water exiting the at least one mineral infuser, wherein the at least one mineral infuser includes a vortex chamber, and wherein the vortex chamber is configured to generate a vortex of incoming water.

These and other aspects of the present invention will become apparent to those skilled in the art after a reading of the following description of the preferred embodiment when considered with the drawings, as they support the claimed invention.

DETAILED DESCRIPTION

Figure 1:
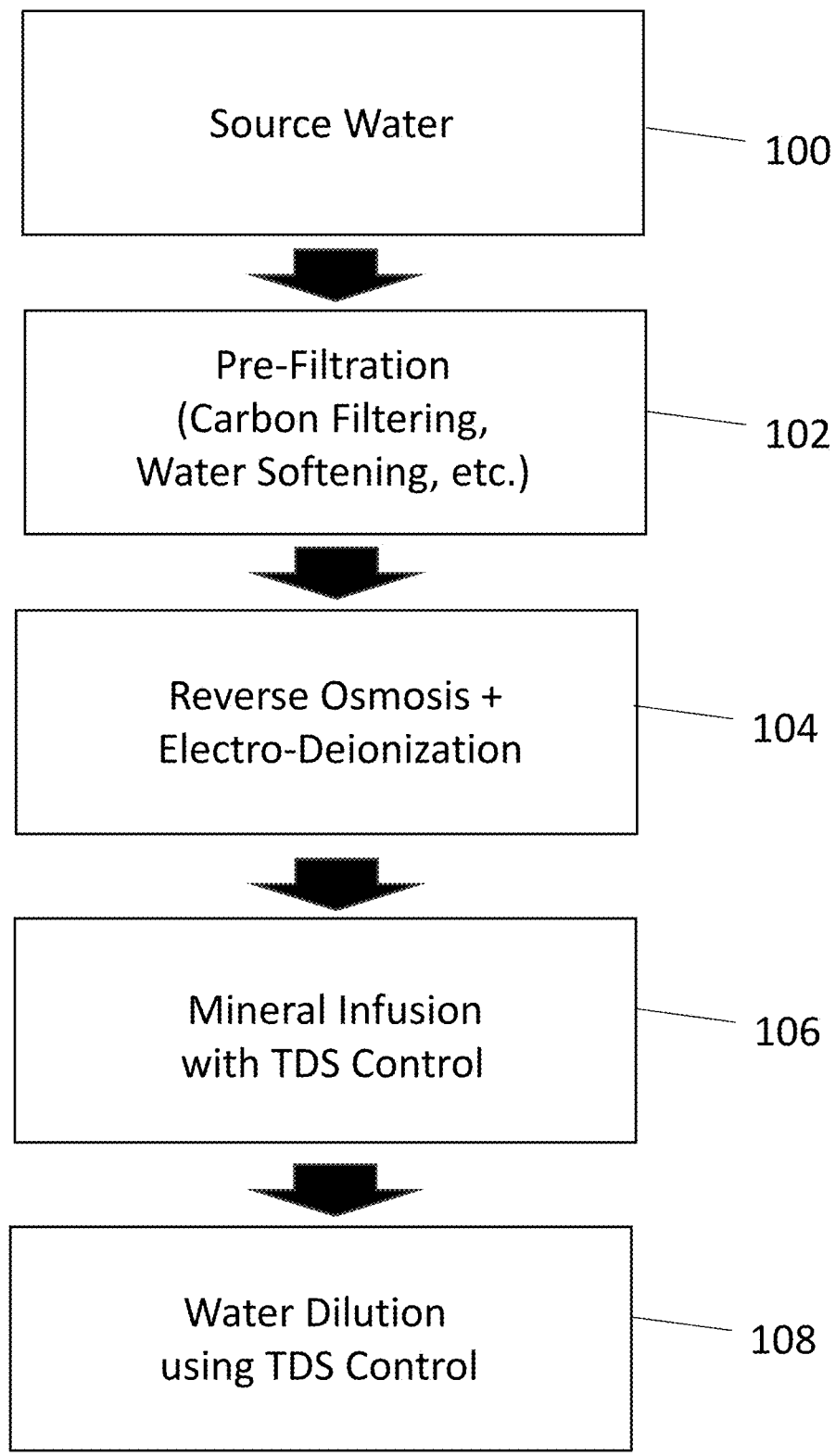
FIG. 1 is a flow chart for a water purification and mineral additive process according to one embodiment of the present invention.

The present invention is generally directed to purifying water and introducing mineral additives to water, and more specifically to methods for generating water having a pH between approximately 9 and 10 by means of introducing mineral additives.

In one embodiment, the present invention is directed to a system for generating mineral-infused water, including an inlet for receiving water, a water purification system configured to remove particulates from the water, at least one mineral infuser including bioceramic material in fluid connection with the water purification system, a first valve configured to allow and restrict water flow between the water purification system and the at least one mineral infuser, at least one total dissolved solids (TDS) sensor and/or at least one pH sensor configured to detect TDS and/or pH of water exiting the at least one mineral infuser, and at least one controller configured to receive sensor data from the at least one TDS sensor and/or the at least one pH sensor and control the first valve and/or a second valve based on the TDS or the pH of the water exiting the at least one mineral infuser, wherein, if the TDS of the water exiting the at least one mineral infuser is below a preset minimum threshold, then the at least one controller causes the water exiting the at least one mineral infuser to be recirculated through the first valve.

In another embodiment, the present invention is directed to a method for generating mineral-infused water, including pumping water in through an inlet of a water purification system, the water purification system removing particulates from the water, a first valve allowing or restricting water flow between the water purification system and at least one mineral infuser including bioceramic material, at least one total dissolved solids (TDS) sensor and/or at least one pH sensor detecting TDS and/or pH of water exiting the at least one mineral infuser, and at least one controller receiving sensor data from the at least one TDS sensor and/or the at least one pH sensor and controlling the first valve and/or a second valve based on the TDS or the pH of the water exiting the at least one mineral infuser, wherein the at least one controller causing the water exiting the at least one mineral infuser to be recirculated through the first valve if the TDS of the water exiting the at least one mineral infuser is below a preset minimum threshold.

In yet another embodiment, the present invention is directed to a system for generating mineral-infused water, including an inlet for receiving water, a water purification system configured to remove particulates from the water, at least one mineral infuser including bioceramic material in fluid connection with the water purification system, a first valve configured to allow and restrict water flow between the water purification system and the at least one mineral infuser, at least one total dissolved solids (TDS) sensor and/or at least one pH sensor configured to detect TDS and/or pH of water exiting the at least one mineral infuser, and at least one controller configured to receive sensor data from the at least one TDS sensor and/or the at least one pH sensor and control the first valve and/or a second valve based on the TDS or the pH of the water exiting the at least one mineral infuser, wherein the at least one mineral infuser includes a vortex chamber, and wherein the vortex chamber is configured to generate a vortex of incoming water.

While prior art systems exist for producing alkaline water using electrolysis and/or with ceramic material. Electrolysis is a flawed way of producing alkaline water, as the separation of charge in the water quickly reverts the water to a neutral or near-neutral pH upon exposure of oxygen. Therefore, while consumers often believe they are drinking alkaline water, by the time they drink the water or by the time the water reaches their digestive system, the water is a significantly lower pH than anticipated. Additionally, existing mineral infusion techniques only run water through a ceramic filter a single time, and do not monitor to ensure that total dissolved solids (TDS) concentration actually increases in the water or that water pH is appropriately increased. Thus, while existing mineral infusion techniques create the illusion of infusing the water, without any control mechanisms to ensure the increase of TDS concentration or pH, it is unlikely that these systems commonly achieve advertised pH values or provide the health benefits associated with those pH values. Therefore, what is needed is a control system to ensure that TDS concentration and pH of water are increased, and increased is a long-lasting way that is provided by electrolysis.

Referring now to the drawings in general, the illustrations are for the purpose of describing one or more preferred embodiments of the invention and are not intended to limit the invention thereto.

The present invention is directed toward a system and method for mineralizing and/or remineralizing water independent of or in conjunction with a process for purifying and filtering the water. Particularly, the present invention includes a system for introducing minerals (e.g., calcium, magnesium, etc.) into water and, in doing so, increase the pH of the water so as to produce alkaline water (e.g., pH 9 water, pH 10 water, etc.). The alkalinity of the water produced according to the present invention is due to mineral additives and therefore is more long lasting than pH increases created by existing ionizers. The present system is preferably able to produce at least 600 gallons of water per day. In another embodiment, the present system is preferably able to produce at least 1000 gallons of water per day.

FIG. 1 is a flow chart for a water purification and mineral additive process according to one embodiment of the present invention. First, the system receives 100 source water. In one embodiment, the source water is water found in a natural source (e.g., spring water, sea water, lake water, river water, well water, etc.). Where the source water is from a natural source, the system is likely to be operating in a large-scale water system (e.g., a municipal water system) or in an independent household system used to clean a well-water source. Alternatively, in another embodiment, the source water is received from a different water system (e.g., from a municipal water system). In one embodiment, the different water system has, itself, subjected the received water to a separate treatment process. Therefore, the system is also capable of being used in household systems that receive source water from a larger water system (e.g., a municipal water system). Such a system is capable of being operated as a below-sink unit, a countertop unit, or any other type of household unit.

After receiving 100 the source water, the system then pre-filters 102 the water. In one embodiment, pre-filtering 102 includes carbon filtering, water softening, and/or other processes. Pre-filtration 102 is designed to remove particulates, heavy metals, and other potential organic contaminants in the water. In one embodiment, the pre-filtration 102 includes at least one screen filter, including a fine mesh capable of separating particulates (e.g., sand, stones, leaves, sticks, animals, plants, etc.) from the incoming water. In one embodiment, the pre-filtration 102 includes increasing the temperature of the water. In one embodiment, the pre-filtration 102 includes increasing the temperature of the water to a boiling point of the water. In one embodiment, the pre-filtration 102 includes moving the water through at least one activated carbon filter, so as to adsorb and therefore removing other particulates from the incoming water. In one embodiment, the pre-filtration 102 includes adding at least one water softening agent to the incoming water so as to remove calcium, magnesium, and other cations from the water to reduce water hardness. Water softening agents include, but are not limited to, lime, soda ash, and/or other water softeners. In one embodiment, pre-filtration 102 includes pre-chlorination (i.e., adding chlorine to the water) so as to minimize growth of bacterial, fungal, algal, or other organic colonies within the system.

In one embodiment, after pre-filtration, the water is subjected to reverse osmosis (RO) 104. Reverse osmosis 104 involves subjecting the water to high pressures in proximity of a semi-permeability membrane, wherein the high pressure counteracts the osmotic pressure across the semi-permeability membrane, allowing water to move from a side of the membrane with a higher solute concentration to a side with lower solute concentration, while filtering out dissolved solids or larger particulates from the water. In one embodiment, in order to prevent larger particulates from clogging the semi-permeable membrane, the semi-permeable membrane is surrounded by additional pre-filters (e.g., a sand filter, a carbon filter, etc.). One of ordinary skill in the art will understand that the methods of performing reverse osmosis according to the present invention are not intended to be limiting. Examples of reverse osmosis system able to be used in the present invention include, but are not limited to, U.S. Pat. Nos. 5,501,798, 5,997,745, 6,120,688, 7,828,971, and 8,980,100, each of which is incorporated by reference in its entirety.

In one embodiment, the water flow exiting the reverse osmosis process is subjected to electrodeionization (EDI). In EDI, the water flow passes between a positive electrode and a negative electrode, with an ion-exchange membrane separating positive ions and negative ions. Methods of electrodeionization able to be used in the present invention are not intended be limiting and include, by way of example and not limitation, those methods disclosed in U.S. Pat. Nos. 5,868,915, 6,929,748, 8,628,653, and 8,709,225, each of which is incorporated herein by reference in its entirety. In one embodiment, after water is processed by reverse osmosis and electrodeionization, the water is stored in an ultra-purified water holding tank. In one embodiment, electrodeionization is used to produce water having a resistivity between about 1 MΩ and 10 MΩ.

Water from the ultra-purified water holding tank flows over a plurality of mineral elements within a mineral infusion chamber (e.g., a bioceramic ball tank) in order to infuse 106 the water with one or more mineral cations, such as calcium ions and magnesium ions, thereby increasing the pH of the water. In one embodiment, a total dissolved solids (TDS) sensor is connected to an exit outflow of the mineral infusion chamber. In one embodiment, if the TDS concentration is below a preset threshold, then the system automatically redirects the water flow back into the first mineral infusion chamber or into an additional mineral infusion chamber. In one embodiment, if the TDS concentration is above the preset threshold, then the system does not redirect the water into a mineral infusion chamber.

In one embodiment, the infusion process is used to create highly mineralized water, with alkaline concentrates up to 8000 ppm. In one embodiment, this highly mineralized water is mixed with water directly existing reverse osmosis and EDI to produce water having alkaline concentrates of approximately 10 ppm to approximately 40 ppm, and having pH between about 9 and about 10.5.

Figure 2:
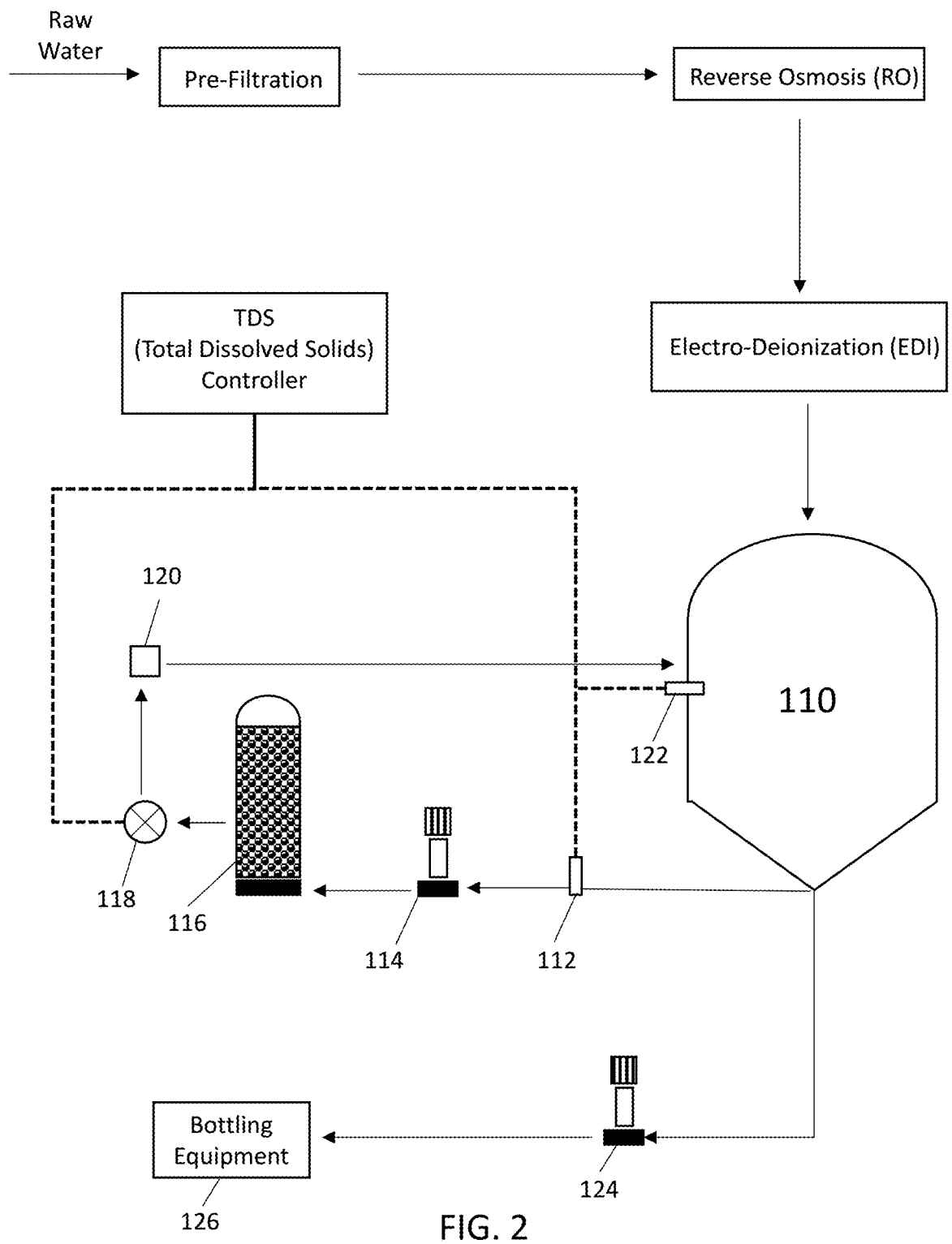
FIG. 2 is a schematic diagram of a mineral additive system according to one embodiment of the present invention.

FIG. 2 is a schematic diagram of a mineral additive system according to one embodiment of the present invention. As shown in FIG. 1, in one embodiment, raw water (or source water) undergoes pre-filtration. In one embodiment, the water is then purified using RO and EDI. In one embodiment, after being processed with RO and EDI, the water is stored in a holding tank 110. A first TDS sensor 112 detects a TDS concentration of water exiting the holding tank 110. If the first TDS sensor 112 detects that the TDS concentration is below a preset threshold, then a recirculation pump 114 pumps the water into a mineral infusion chamber 116. In one embodiment, the mineral infusion chamber 116 includes a plurality of bioceramic components, by way of example and not limitation, the bioceramic components are spherical shaped as balls (solid or hollow) (e.g., calcium carbonate balls) or other bioceramic pieces (e.g., shells), including alkaline elements (e.g., sodium, calcium, potassium, magnesium, etc.) or compounds including alkaline elements (e.g., calcium carbonate, calcite, etc.). In one embodiment, the plurality of bioceramic balls or other bioceramic pieces are naturally sourced. In one embodiment, the plurality of bioceramic balls have radii between about ⅛ of an inch and about ⅜ of an inch. In one embodiment, the bioceramic balls are formed from calcium (e.g., sourced from coral and/or pearls) heated to varying temperatures and subsequently mixed with clay. In another embodiment, the bioceramic components are coated to enhance mineralization of the water that contacts them during processing. Bioceramic as referred to herein refers to ceramic materials that are biocompatible with the human body and safe for consumption. In one embodiment, the bioceramic materials used herein are natural, marine-sourced ceramics.

Bioceramics able to be used with the present invention include, but are not limited to, those described in U.S. Patent Publication Nos. 2017/0143695 and 2020/0222390 and U.S. Pat. No. 10,500,201 and those ceramics created by LUCIDEON's MIDAR processes and/or flash sintering process, each of which is incorporated herein by reference in its entirety. In one embodiment, the bioceramics used include components made from food grade white Portland cement, food grade dolomite, organic food grade calcium carbonate, food grade organic crushed oyster shell, food grade organic oral, mineral salts, and/or other bioceramic materials. In one embodiment, the materials are generated through pan granulation and/or compaction processes.

In one embodiment, a flow control valve 118 regulates flow output of the mineral infusion chamber 116. By limiting the flow rate out of the mineral infusion chamber 116, the system is better able to control the retention time of water in the mineral infusion chamber 116 and therefore allow a greater number of cations from the plurality of bioceramic balls or other bioceramic pieces to enter the water. In one embodiment, the maximum flow rate allowed by the flow control valve 118 is automatically set based on the sensor data generated by the first TDS sensor 112. In one embodiment, a flow sensor 120 detects a flow rate out of the mineral infusion chamber 116 and automatically adjusts the flow control valve 118 if the intended flow rate is not achieved (i.e., the flow rate is higher or lower than expected).

After exiting the mineral infusion chamber 116, the water returns to the holding tank 110. In one embodiment, a second TDS sensor 122 is attached to the holding tank 110 and monitors TDS concentration within the holding tank 110. In one embodiment, if the TDS concentration within the holding tank 110 is below a preset threshold, then the water is allowed to continue to circulate through the mineralization circuit. In one embodiment, if the TDS concentration in the holding tank 110 is above a preset threshold, then the water is blocked from entering the mineralization circuit. The combination of the first TDS sensor 112, the second TDs sensor 122, and the flow control valve 118 together form the TDS controller of the present invention.

In one embodiment, if the TDS concentration within the holding tank 110 is above a preset threshold, then the water is pumped by an alkaline water service pump 124 to bottling equipment 126 and thereafter packaged into bottles, cans, and/or other containers. However, one of ordinary skill in the art will understand that the alkaline water service pump 124 is not limited to being connected to bottling equipment 126 and is also able to connect to other water outflows, including at least one controlled outlet or at least one faucet. Therefore, the system according to the present invention is able to serve as a system for producing bottled water, tap water, or water output from a municipal water for a variety of purposes.

In one embodiment, in addition to or in lieu of TDS sensors, the system includes one or more pH sensors. In one embodiment, the water recirculates through the mineralization system if the pH of the water is dedicated to be beneath a preset minimum threshold. In one embodiment, the water is pumped by the alkaline water service pump 124 if the pH is above a preset minimum threshold. In one embodiment, sensor data generated by the at one or more pH sensors is used to control the flow rate of water allowed by the flow control valve. For example, if pH is below a minimal threshold, the flow control valve decreases the allowed flow rate out of the mineral infusion chamber 116.

In one embodiment, the water in the holding tank 110 is mineralized until it has a TDS concentration of approximately 8000 ppm. Before this water is pumped by the alkaline water service pump 124, it is mixed with ultrapurified water (i.e., water processed by reverse osmosis and EDI) to dilute the water to approximately 10 to approximately 40 ppm TDS concentration. In one embodiment, a third TDS sensor monitors a post-dilution water flow before the water enters the alkaline water service pump 124. In one embodiment, if the third TDS sensor detects that the TDS concentration is above a preset maximum threshold or below a preset minimum threshold, then a check valve automatically prevents the water from entering the alkaline water service pump 124.

Figure 3:
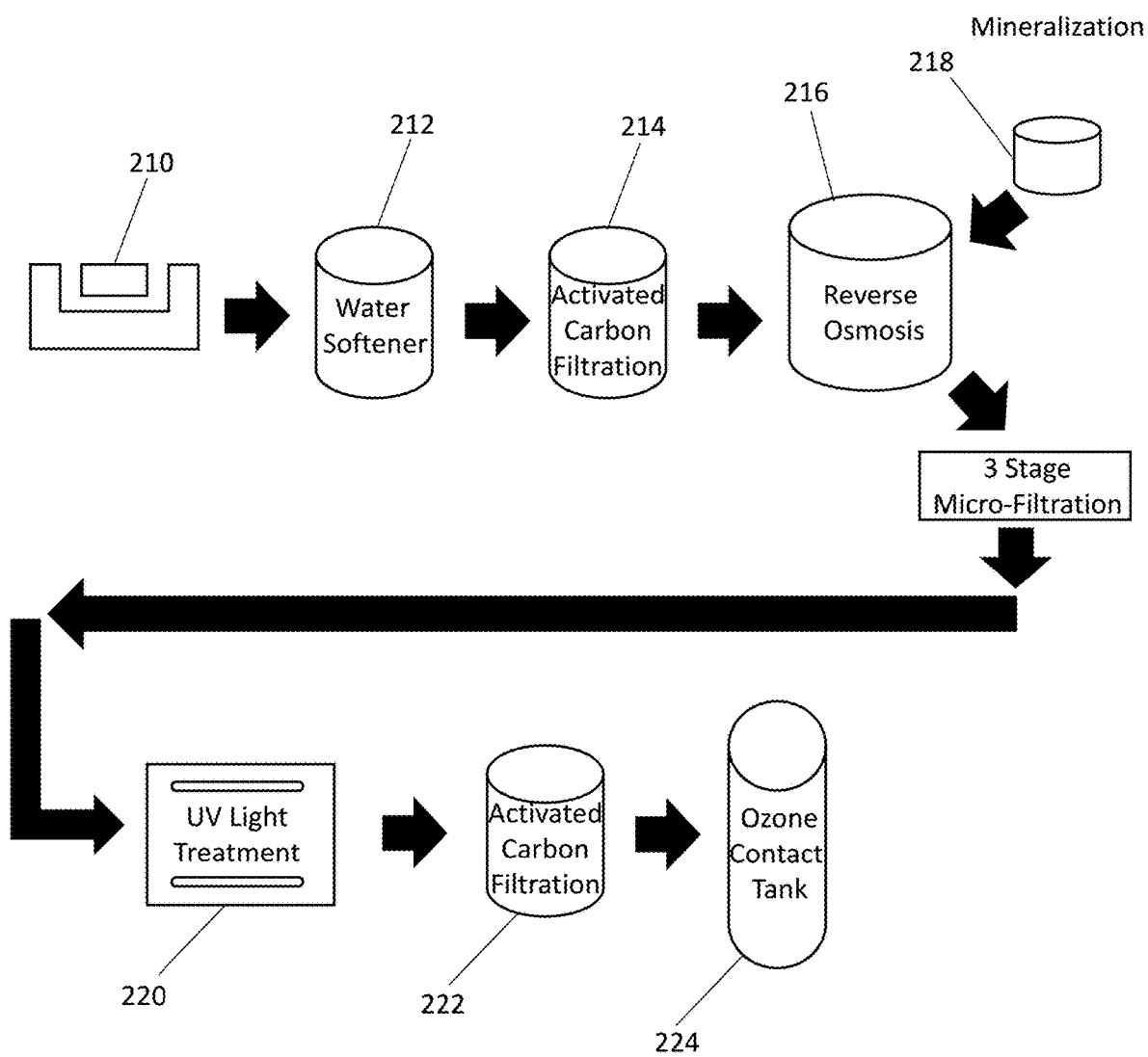
FIG. 3 is a flow diagram for a method of water treatment according to one embodiment of the present invention.

FIG. 3 is a flow diagram for a method of water treatment according to one embodiment of the present invention. In one embodiment, source water 210 (e.g., spring water, ocean water, well water, river water, lake water, water from a municipal water system, etc.) enters the system. Water softeners 212 such as lime or soda ash are added to the source water in order to remove excess minerals and therefore reduce water hardness. The water is then filtered by an active carbon filter 214 in order to remove chlorine and odorous compounds in the water. After carbon filtration 214, the water enters a reverse osmosis system 216. Preferably, the reverse osmosis system 216 is capable of removing up to 99.5% of dissolved solids in the water. The water is then mineralized 218. In one embodiment, the mineralization 218 is carried out by passing the water over a plurality of bioceramic pieces and limiting the flow rate of the water, as described with respect to FIG. 2. In one embodiment, mineralization 218 continues until the water has a TDS concentration of approximately 4000 ppm. In one embodiment, after mineralization 218, the water is then subjected to a three-stage micro-filtration process. In one embodiment, the three-stage microfiltration process includes ultraviolet (UV) light treatment 220 to eliminate organic matter, activated carbon filtration 222 to polish water, and ozone filtration 224 for final purification. One of ordinary skill in the art will understand that the three-stage microfiltration process is able to be carried out in any order and is not limited to using UV treatment 220 first and ozone filtration 224 last.

Figure 4:
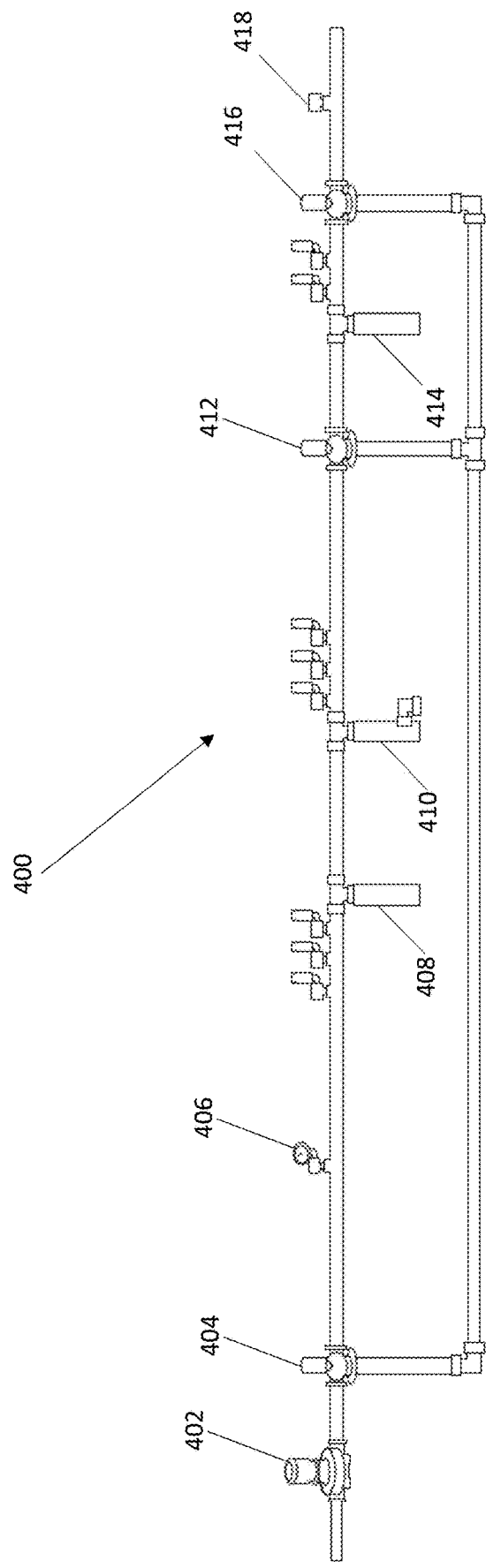
FIG. 4 illustrates a schematic of a water treatment and mineral additive system according to one embodiment of the present invention.

FIG. 4 illustrates a schematic of a water treatment and mineral additive system according to one embodiment of the present invention. FIG. 4 illustrates one version of a water treatment and mineral additive system 400 in which the water is pumped by a first pump 402 before passing through a valve 404 to enter a water treatment section, where impurities in the water are removed. In one embodiment, the valve 404 is a mixing or diverter valve capable of mixing incoming water with processed water exiting the reverse osmosis system 410 based on readings from pressure sensors, pH sensors, chlorine level sensors, total dissolved solids sensors, and/or other sensors. In one embodiment, the water treatment section includes at least one pressure sensor 406 configured to detect the water pressure in the system 400. While the system shows the water pressure sensor as being positioned before the pre-filtration 408 and reverse osmosis 410 systems, one of ordinary skill in the art will understand that the system 400 is able to include, in addition to or in lieu of the at least one pressure sensor 406 before the pre-filtration system 408, at least one pressure sensor between the pre-filtration system 408 and reverse osmosis system 410 or after the reverse osmosis system 410. Additionally, while only a single pressure sensor 406 is shown, one of ordinary skill in the art will understand that the system is also capable of including multiple pressure sensors and/or one or more other types of sensors, including at least one chlorine sensor (e.g., an organic photodiode (OPD) sensor), at least one pH sensor, and/or at least one TDS sensor. Output of any of these sensors alone or in combination with readings from other sensors are able to be transmitted to a controller capable of regulating the valve 404 for regulating a quantity of processed water mixed with incoming water into the system 400.

In one embodiment, the pre-filtration system 408 includes at least one sediment filter for removing larger-sized particles, at least one carbon pre-filter (e.g., to remove chlorine and other trace contaminants), at least one ultraviolet-C (UVC) filter, and/or one or more other filters. Preferably, after passing through the pre-filtration system 408 and the reverse osmosis system 410, the water has low enough TDS to enter a mineral infusion section of the system 400. In one embodiment, at least one TDS sensor and/or at least one other sensor measures water exiting the reverse osmosis system 410 and controls at least one valve 412 allowing or preventing water from entering the mineral infusion section.

In one embodiment, after passing through the at least one valve 412 into the mineral infusion section, the water is treated with a mineral infusion system 414. In one embodiment, the at least one valve 412 is operable to regulate a quantity of infused water (i.e., water exiting the mineral infusion system 414) to inject back into the beginning of the mineral infusion section to mix with processed, but not infused water. The amount of infused water to introduce back into the system helps to regulate the overall TDS and/or pH to achieve a desired value. In one embodiment, the mineral infusion section includes at least one TDS sensor and/or at least one pH sensor, wherein the TDS sensor and/or at least one pH sensor detects whether the TDS and/or pH of the water exiting the mineral infusion system 414 are above a preset minimal threshold and below a preset maximum threshold. In one embodiment, readings from the at least one TDS and/or pH sensor in the mineral infusion section are transmitted to at least one controller operable to regulate a valve 416 (and/or the valve 412 to determine amount of infused water to introduce back into the mineral infusion section) to allow or prevent water from exiting from the mineral infusion section to the outflow of the system 400. In one embodiment, the controller is configured to receive updated values for the preset minimal threshold and/or the preset maximum threshold from at least one user device (e.g., a smart phone application, a computer, etc.). This allows selectivity of optimal TDS or pH values depending on a user's individual preferences or dependent on local rules and regulations (e.g., maximum pH regulations).

In one embodiment, if the TDS or pH is higher than desired after passing through the mineral infusion section, the system includes a line (not shown) operable to directly link processed water entering valve 412 into the outflow stream in order to dilute the water as desired.

In one embodiment, the system 400 includes at least one outflow sensor 418 detecting the flow volume and/or flow pressure of the water exiting the system 400. In one embodiment, readings from the at least one outflow sensor 418 are transmitted to at least one outflow controller. In one embodiment, the at least one outflow controller is operable to regulate total amount of water entering the system through the at least one first valve 404, the amount of processed water entering the mineral infusion section through the at least one second valve 412, and/or the amount of infused water exiting the system 400 through the at least one third valve 416.

Figure 5:
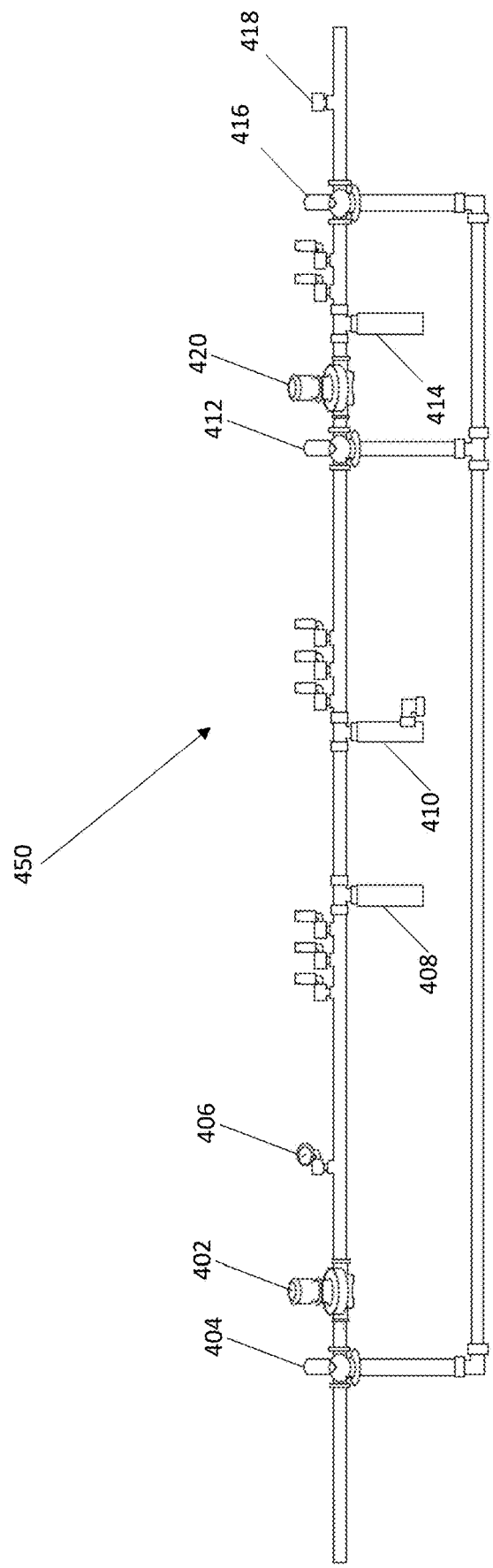
FIG. 5 illustrates a schematic of a water treatment and mineral additive system according to another embodiment of the present invention.

FIG. 5 illustrates a schematic of a water treatment and mineral additive system according to another embodiment of the present invention. FIG. 5 represents a preferred embodiment of the water treatment and mineral additive system 450 relative to the version in FIG. 4. While most components are analogous between the system 450 and the system 400 discussed above with reference to FIG. 4, the system 450 includes a first pump 402 and a second pump 420 and the first pump 402 is located beyond the at least one first valve 404, rather than before the at least one first valve 404. The positioning of the first valve 404 helps to ensure that the system is able to recirculate processed water back into the water treatment section in the event that the water is not sufficiently purified. Similarly, the inclusion of the second pump 420 allows the water to be recirculated in the mineral infusion section to allow for more precise control of TDS or pH in the system 450.

Figure 6:
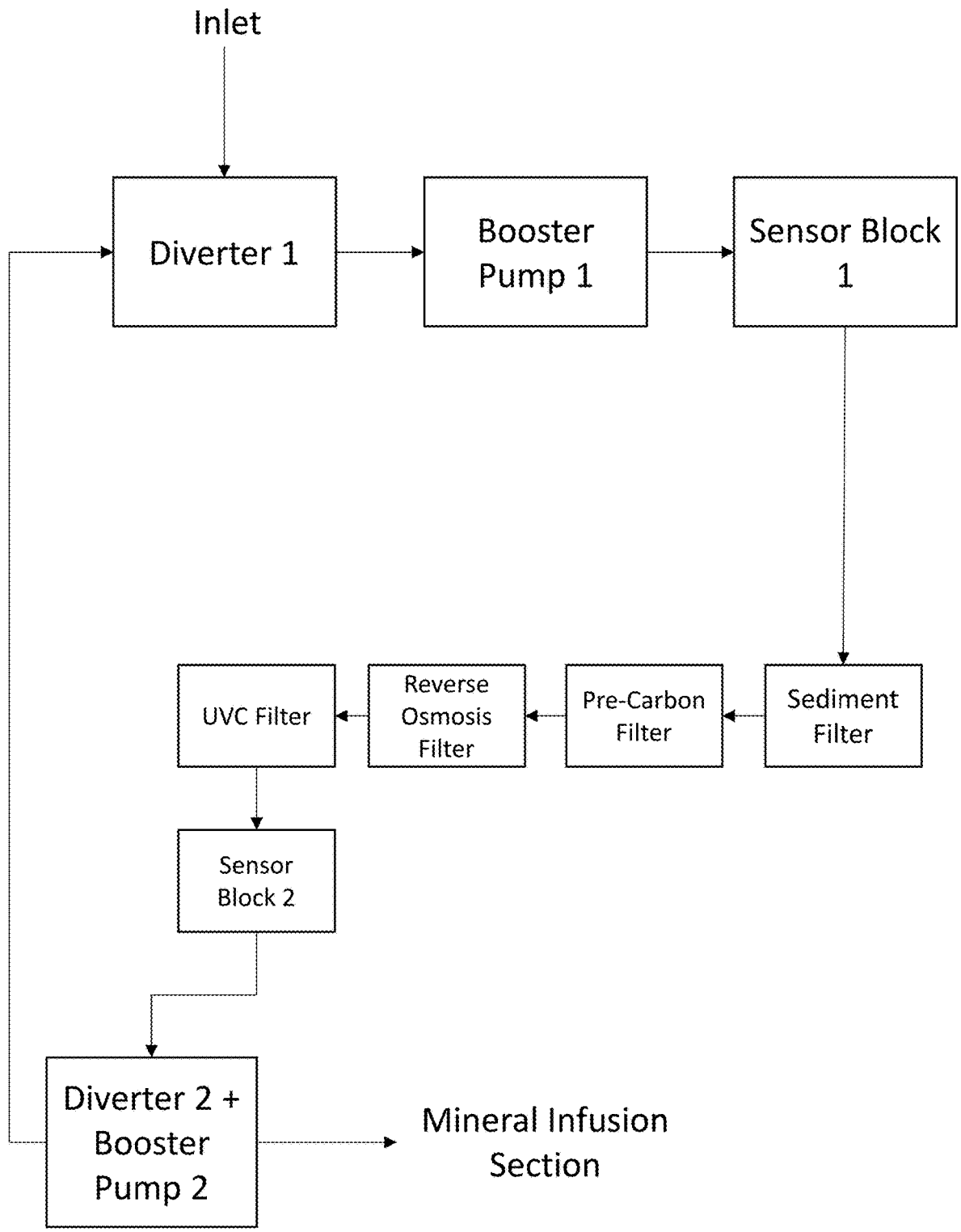
FIG. 6 illustrates a schematic of a water filtration section of a water treatment and mineral additive system according to one embodiment of the present invention.

FIG. 6 illustrates a schematic of a water filtration section of a water treatment and mineral additive system according to one embodiment of the present invention. In one embodiment, water enters through an inlet of the system (e.g., from an inline water system or reservoir) and passes through a first diverter. The water is then pumped by a first booster pump and passes by a first sensor block. In one embodiment, the first sensor block includes a pressure valve, at least one pH sensor, at least one TDS sensor, at least one temperature sensor, and/or any other type of water quality sensor. After passes by the first sensor block, the water is filtered by one or more filters, including a sediment filter, a pre-carbon filter, a reverse osmosis filter, and/or a UVC filter. After being filtered, the water passes by a second sensor block. In one embodiment, the second sensor block includes a pressure valve, at least one pH sensor, at least one TDS sensor, at least one temperature sensor, and/or any other type of water quality sensor. If the values detected by the second sensor block are outside of a preset tolerance, then the water is diverted back to the first diverter (e.g., by a second diverter connected to the first diverter) and pumped again by the first booster pump. If the water is determined to be acceptably within filter tolerance levels, then the diverter sends the incoming water to the mineral infusion section of the line, including a second booster pump.

Figure 7:
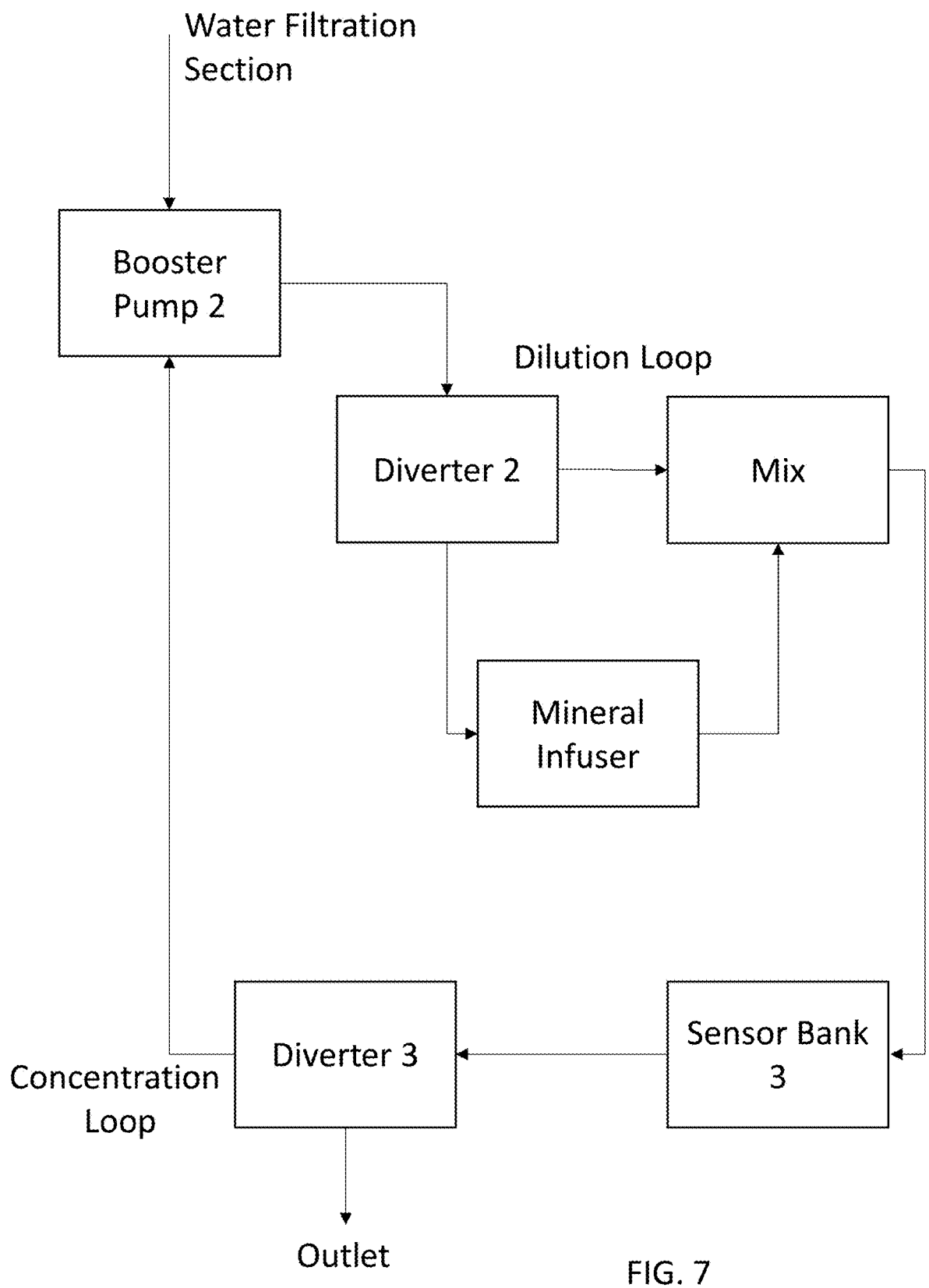
FIG. 7 illustrates a mineral infusion section of a water treatment and mineral additive system according to one embodiment of the present invention.

FIG. 7 illustrates a mineral infusion section of a water treatment and mineral additive system according to one embodiment of the present invention. After entering the mineral infusion section from the water filtration section, a second booster pump sends the water through a second diverter to a mineral infuser including bioceramic materials. The water exiting the mineral infuser system is then detected by a third sensor bank. In one embodiment, the third sensor bank includes at least one TDS sensor and/or at least one pH sensor. In one embodiment, if the TDS and/or pH of the water is detected as too high, then a controller commands the second diverter to automatically bleed an amount of water to mix with the water passing through the mineral infuser so as to dilute the infused water, creating a feedback dilution loop. Alternatively, if the TDs and/or pH is determined to be too low, then after passing through the third sensor bank, the water moves into a third diverter which automatically diverts the water back to the second diverter to reenter the mineral infuser in order to produce higher pH and higher TDS water, providing for a feedback concentration loop. If the water is determined to be above a preset minimum pH and/or TDS and below a preset maximum pH and/or TDS, then the water passes to an outlet from the third diverter and is ready to be dispensed.

Figure 8:
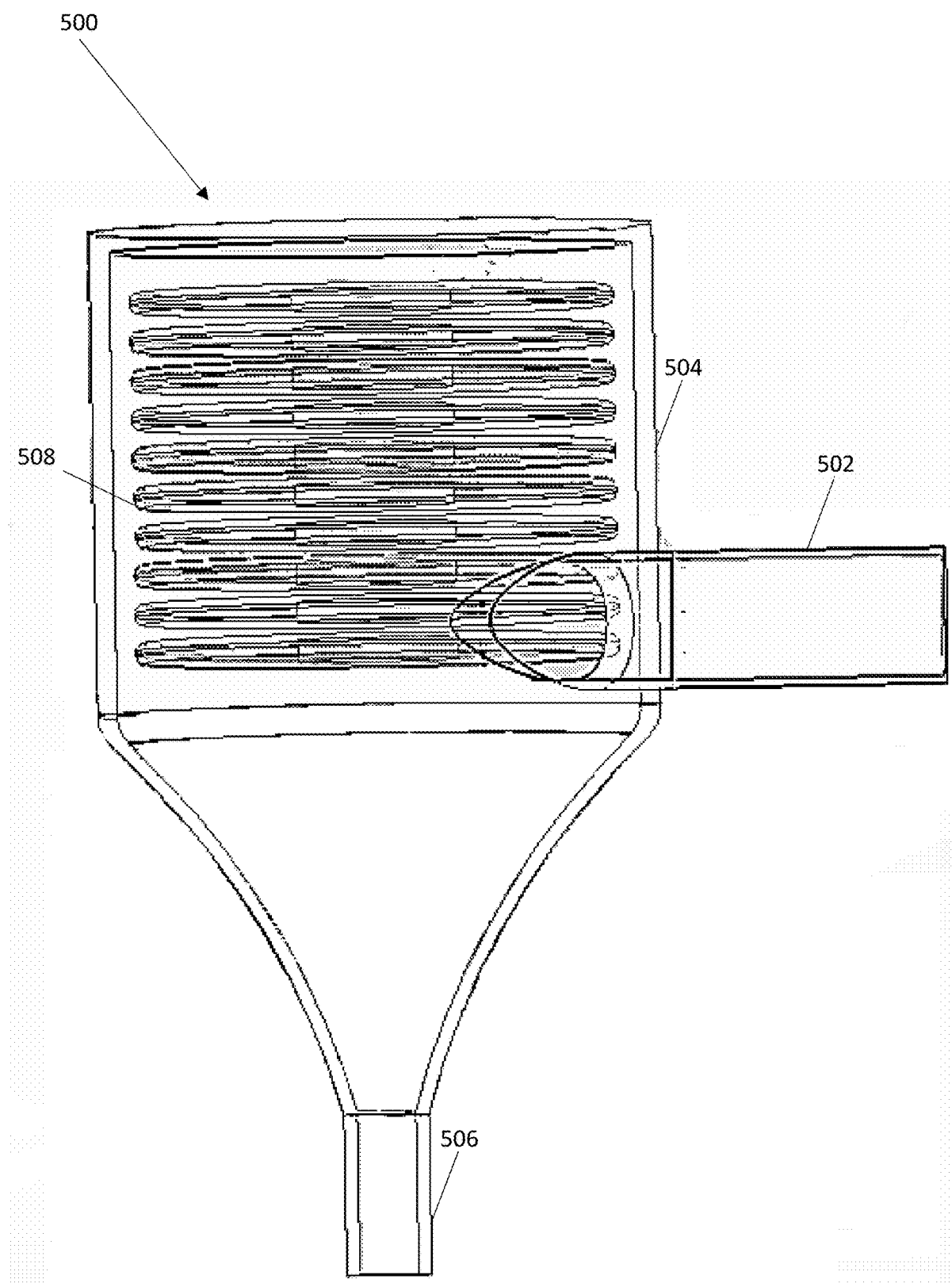
FIG. 8 illustrates a transparent orthogonal side view of a vortex mineral infuser according to one embodiment of the present invention.

FIG. 8 illustrates a transparent orthogonal side view of a vortex mineral infuser according to one embodiment of the present invention. In one embodiment, the at least one mineral infusion system is a vortex infuser 500. In one embodiment, the vortex infuser 500 includes an inlet 502 for accepting incoming water. In one embodiment, the inlet 502 is connected to a cylindrical (or otherwise shaped) infusion chamber 504. The infusion chamber 504 includes a tapered bottom connected to an outflow 506. In one embodiment, the infusion chamber 504 includes bioceramic beads, bioceramic materials, or other mineralization sources for increasing TDS of the incoming water. The infusion chamber 504 is configured to generate a vortex. The vortex allows for longer contact times of the water with the bioceramic beads, bioceramic materials, or other mineralization sources, allowing for increased TDS without needing to run the water through multiple infusers or to run the water through the infuser multiple times to achieve a desired TDS level. In one embodiment, the infusion chamber 504 includes one or more bioceramic discs 508 over which the water flows to allow for mineral infusion.

Figure 9:
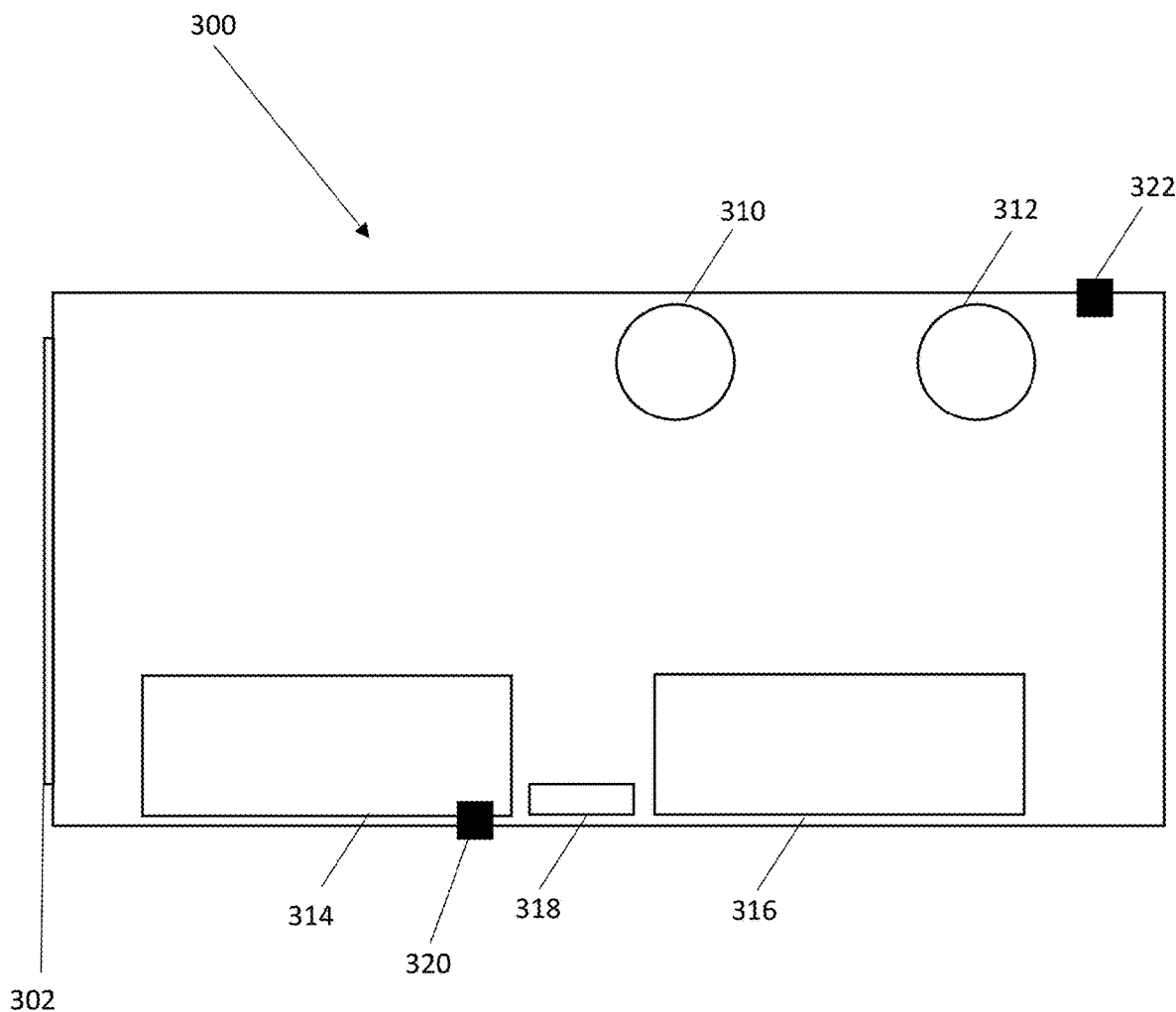
FIG. 9 is a schematic diagram for a water treatment and mineral additive container according to one embodiment of the present invention.

FIG. 9 is a schematic diagram for a water treatment and mineral additive container according to one embodiment of the present invention. The container 300 shown in FIG. 9 is particularly suited for larger scale municipal water systems or for water bottling systems. The container 300 includes a door 302 for maintenance personnel to enter the container 300. The container 300 includes at least one reverse osmosis (RO) tank 310 and at least one alkaline water tank 312. The alkaline water tank 312 includes water having a TDS concentration greater than a preset threshold. In one embodiment, the RO tank 310 includes water having undergone reverse osmosis and other filtration and purification steps via a reverse osmosis and purification system 314 within the container 300. The water in the RO tank 310 is run through a mineralization system 316 until the water has a TDS concentration surpassing a preset minimum threshold, at which point it flows into the alkaline water tank 312 and awaits transport out of the container 300 through a piping connection nozzle 322 extending through the exterior wall of the container 300. Additionally, the container 300 includes a circuit breaker 318 connected to a power source outside of the container 300 through an opening 320 in a wall of the container 300.

Figure 10:
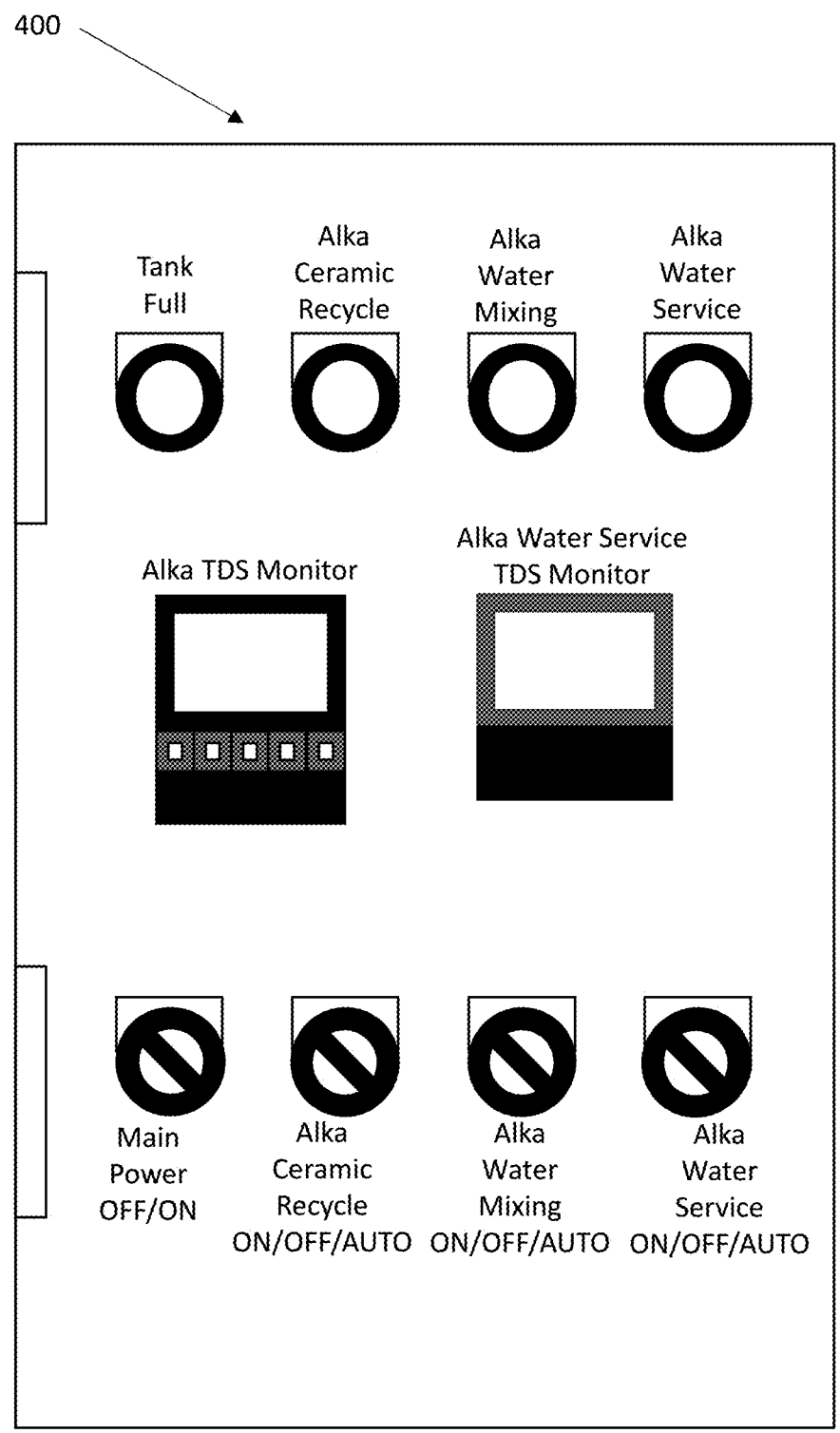
FIG. 10 is a front view of a control panel for a mineral additive system according to one embodiment of the present invention.

FIG. 10 is a front view of a control panel for a mineral additive system according to one embodiment of the present invention. In one embodiment, a water treatment device or container according to the present invention includes at least one control panel. In one embodiment, the control panel includes displays showing the TDS concentration of the alkaline water holding tank, the TDS concentration of the outgoing water stream, the pH concentration of the alkaline water holding tank, and/or the pH of the outgoing water stream. In one embodiment, the at least one control panel includes at least one indicator noting whether the tank is full or not. In one embodiment, the at least one control panel includes a plurality of switches, operable to turn power on or off for the system, turn on or off an outflow of water from the alkaline water tank, turn on or off the mineralization circuit, and/or alter other characteristics of the system.

In one embodiment, the water treatment and mineralization system includes at least one antenna for communication via WI-FI (or other wireless local area networks), BLUETOOTH (or other wireless personal area networks), and/or other networks. In another embodiment, the water treatment and mineralization system is able to receive commands through at least one wired network (e.g., ETHERNET). Connectivity allows the system to receive user input from at least one user device (e.g., at least one control panel, at least one smart phone, at least one smart watch, at least one computer, etc.) regarding a desired minimum or maximum TDS or pH. In one embodiment, the system is operable to transmit status information for the water system based on sensor data from one or more sensors (e.g., pH readings, TDS readings, pressure readings, flow volume readings, etc.). In one embodiment, the system automatically transmits status information regarding the health of one or more filters in the system and is operable to transmit notifications for replacing the one or more filters as needed.

Figure 11:
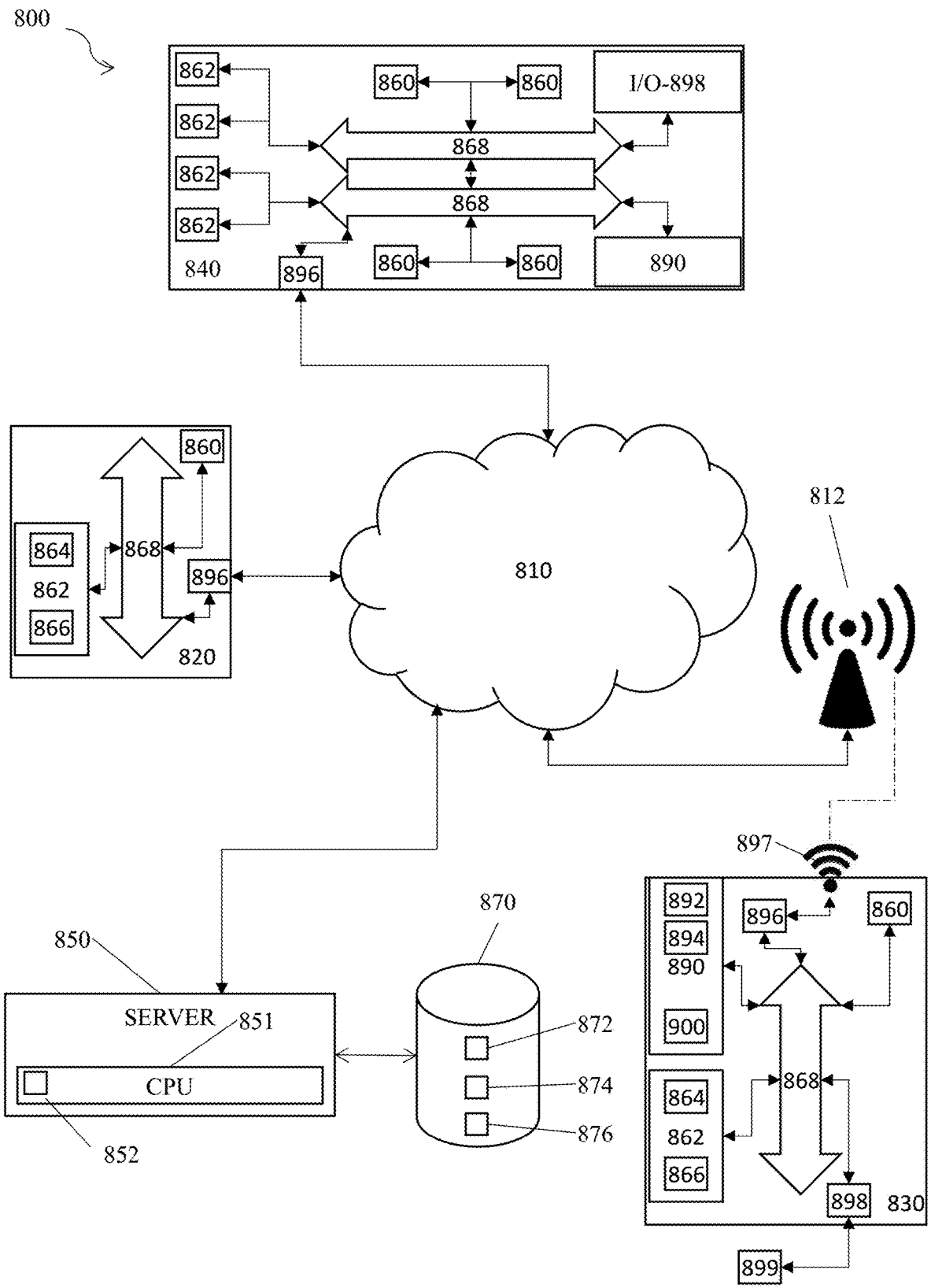
FIG. 11 is a schematic diagram of a system of the present invention.

FIG. 11 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 11, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors. It is also contemplated that the computer system 800 is operable to not include all of the components shown in FIG. 11, is operable to include other components that are not explicitly shown in FIG. 11 or is operable to utilize an architecture completely different than that shown in FIG. 11. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for generating mineral-infused water, comprising:
    an inlet for receiving water;
    a water purification system configured to remove particulates and contaminants from the water;
    at least one vortex mineral infuser including at least one bioceramic material in fluid connection with the water purification system;
    a first valve positioned between the inlet and the water purification system configured to allow and restrict water flow exiting the water purification system to divert and recirculate the water back through the water purification system;
    a second valve positioned between the water purification system and the at least one vortex mineral infuser, operable to divert water exiting the water purification system to bypass the at least one vortex mineral infuser to dilute water exiting the at least one vortex mineral infuser;
    a post-purification sensor bank, positioned between the water purification system and the second valve, including at least one post-purification total dissolved solids (TDS) sensor, at least one post-purification chlorine sensor, and/or at least one purification pH sensor;
    a first pump positioned between the first valve and the water purification system, wherein the first pump is configured to control pressure flow of water through the water purification system;
    a second pump positioned between the second valve and the at least one vortex mineral infuser, wherein the second pump is configured to control flow of water through the at least one vortex mineral infuser;
    a third valve positioned between the at least one vortex mineral infuser and an outlet of the system, operable to divert water exiting the at least one vortex mineral infuser to reenter the at least one vortex mineral infuser;
    a post-mineralization sensor bank including at least one post-mineralization TDS sensor and/or at least one post-mineralization pH sensor configured to detect TDS and/or pH of water exiting the at least one vortex mineral infuser; and
    at least one controller configured to receive sensor data from the post purification sensor bank and the post-mineralization sensor bank;
    wherein the at least one controller is operable to control an amount of water diverted and recirculated by the first valve based on sensor data from the post-purification sensor bank;
    wherein the at least one controller is operable to control an amount of water diverted by the second valve and/or the third valve based on sensor data from the post-mineralization sensor bank;
    wherein, if the TDS and/or pH level of the water exiting the at least one vortex mineral infuser is above a preset maximum threshold, then the at least one controller causes a quantity of water exiting the water purification system to bypass the at least one vortex mineral infuser to mix with the water exiting the at least one vortex mineral infuser, and
    wherein, if the TDS and/or pH level of the water exiting the at least one vortex mineral infuser is below a preset minimum threshold, then the at least one controller causes the water exiting the at least one vortex mineral infuser to be diverted back through the at least one vortex mineral infuser via the first valve.

2. The system of claim 1, wherein the water purification system includes at least one pre-filtration device and/or at least one reverse osmosis device.

3. The system of claim 1, wherein the at least one bioceramic material include food grade white Portland cement, food grade dolomite, organic food grade calcium carbonate, food grade organic crushed oyster shell, food grade organic oral, mineral salts.

4. The system of claim 1, wherein the at least one controller modifies modify an amount of incoming water through the first valve based on readings from one or more sensors, and wherein the one or more sensors include at least one pressure sensor, at least one flow volume sensor, and/or any sensors included in the post-purification sensor bank.

5. The system of claim 1, wherein the inlet receives water from an inline water system.

6. The system of claim 1, wherein the system is in network communication with at least one user device, and wherein the system receives commands from the at least one user device to modify the preset minimum threshold and/or the preset maximum threshold for pH or TDS of outgoing water.

7. A method for generating mineral-infused water, comprising:
    pumping water in through an inlet of a water purification system;
    the water purification system removing particulates and contaminants from the water;
    at least one vortex mineral infuser, including at least one bioceramic material, receiving water flow from the water purification system;
    a first valve, positioned between the inlet and the water purification system, allowing and restricting water flow exiting the water purification system to divert and recirculate
    a post-purification sensor bank, positioned downstream of the water purification system and including at least one post-purification total dissolved solids (TDS) sensor, at least one post-purification chlorine sensor, and/or at least one purification pH sensor, detecting a TDS, a chlorine level, and/or a pH of water exiting the water purification system;

a first pump, positioned between the first valve and the water purification system, controlling pressure flow of water through the water purification system;

a post-mineralization sensor bank, including at least one post-mineralization total dissolved solids (TDS) sensor and/or at least one post-mineralization pH sensor detecting TDS and/or pH of water exiting the at least one vortex mineral infuser;

at least one controller causing the first valve to recirculate water through the water purification system via the first valve based on sensor data from the post-purification sensor bank;

the at least one controller causing a second valve, positioned between the water purification system and the at least one vortex mineral infuser, to divert water exiting the water purification system to bypass the at least one vortex mineral infuser to dilute water exiting the at least one vortex mineral infuser when TDS or pH of water exiting the at least one mineral infuser is above a preset maximum threshold;

the at least one controller causing a third valve, positioned between the at least one vortex mineral infuser and an outlet of the system, to divert water exiting the at least one vortex mineral infuser to reenter the at least one vortex mineral infuser when TDS or pH of water existing the at least one mineral infuser is below a preset minimum threshold; and a second pump, positioned between the second valve and the at least one vortex mineral infuser, controlling flow of water through the at least one vortex mineral infuser.

8. The method of claim 7, wherein the water purification system includes at least one pre-filtration device and/or at least one reverse osmosis device.

9. The method of claim 7, wherein the at least one bioceramic material include food grade white Portland cement, food grade dolomite, organic food grade calcium carbonate, food grade organic crushed oyster shell, food grade organic oral, mineral salts.

10. The method of claim 7, further comprising the at least one controller modifying an amount of incoming water based on readings from one or more sensors, wherein the one or more sensors include at least one pressure sensor, at least one flow volume sensor, and/or other sensors in the post-purification sensor bank.

11. The method of claim 7, further comprising the inlet receiving water from an inline water system.

12. The method of claim 7, further comprising system being in network communication with at least one user device, and the system receiving commands from the at least one user device to modify the preset minimum threshold and/or the preset maximum threshold for pH or TDS of outgoing water.

13. A system for generating mineral-infused water, comprising:

an inlet receiving water from an inline water system;

a water purification system configured to remove particulates contaminants from the water;

at least one vortex mineral infuser including at least one bioceramic material in fluid connection with the water purification system;

a first valve positioned between the inlet and the water purification system configured to allow and restrict water flow exiting the water purification system to divert and recirculate the water back through the water purification system;

a second valve positioned between the water purification system and the at least one vortex mineral infuser, operable to divert water exiting the water purification system to bypass the at least one vortex mineral infuser to dilute water exiting the at least one vortex mineral infuser;

a post-purification sensor bank, positioned between the water purification system and the second valve, including at least one post-purification total dissolved solids (TDS) sensor, at least one post-purification chlorine sensor, and/or at least one purification pH sensor;

a first pump positioned between the first valve and the water purification system, wherein the first pump is configured to control pressure flow of water through the water purification system;

a second pump positioned between the second valve and the at least one vortex mineral infuser, wherein the second pump is configured to control flow of water through the at least one vortex mineral infuser;

a post-mineralization sensor bank including at least one post-mineralization TDS sensor and/or at least one post-mineralization pH sensor configured to detect TDS and/or pH of water exiting the at least one vortex mineral infuser;

at least one controller configured to receive sensor data from the post purification sensor bank and the post-mineralization sensor bank;

wherein the at least one controller is operable to control an amount of water diverted and recirculated by the first valve based on sensor data from the post-purification sensor bank;

wherein the at least one controller is operable to control an amount of water diverted by the second valve and/or the third valve based on sensor data from the post-mineralization sensor bank;

wherein, if the TDS and/or pH level of the water exiting the at least one vortex mineral infuser is above a preset maximum threshold, then the at least one controller causes a quantity of water exiting the water purification system to bypass the at least one vortex mineral infuser to mix with the water exiting the at least one vortex mineral infuser;

wherein, if the TDS and/or pH level of the water exiting the at least one vortex mineral infuser is below a preset minimum threshold, then the at least one controller causes the water exiting the at least one vortex mineral infuser to be diverted back through the at least one vortex mineral infuser via the first valve;

wherein the at least one bioceramic material include food grade white Portland cement, food grade dolomite, organic food grade calcium carbonate, food grade organic crushed oyster shell, food grade organic oral, mineral salts; and wherein the system is in network communication with at least one user device, and wherein the system receives commands from the at least one user device to modify the preset minimum threshold and/or a maximum threshold for pH or TDS of outgoing water.

* * * * *